United States Patent
Lee et al.

(10) Patent No.: US 11,700,666 B2
(45) Date of Patent: *Jul. 11, 2023

(54) METHOD AND APPARATUS FOR TRIGGERING TRANSMISSION CARRIER SELECTION IN WIRELESS COMMUNICATION SYSTEM

(71) Applicant: LG Electronics Inc., Seoul (KR)

(72) Inventors: Jaewook Lee, Seoul (KR); Taehun Kim, Seoul (KR); Youngdae Lee, Seoul (KR); Jongwoo Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,160

(22) Filed: Feb. 8, 2022

(65) Prior Publication Data

US 2022/0167459 A1     May 26, 2022

Related U.S. Application Data

(63) Continuation of application No. 16/406,599, filed on May 8, 2019, now Pat. No. 11,297,681.

(Continued)

(51) Int. Cl.
*H04W 80/02* (2009.01)
*H04W 72/02* (2009.01)
(Continued)

(52) U.S. Cl.
CPC .......... *H04W 80/02* (2013.01); *H04L 1/0003* (2013.01); *H04W 4/40* (2018.02); *H04W 36/08* (2013.01);
(Continued)

(58) Field of Classification Search
CPC ...... H04L 1/0003; H04L 5/001; H04W 36/08; H04W 4/40; H04W 72/02;
(Continued)

(56) References Cited

U.S. PATENT DOCUMENTS

2017/0150490 A1*   5/2017   Chen ................. H04W 88/06
2017/0215119 A1*   7/2017   Hong ................. H04L 67/12
(Continued)

FOREIGN PATENT DOCUMENTS

EP         3148283       3/2017
WO    WO2017150956    9/2017
(Continued)

OTHER PUBLICATIONS

3GPP TS 36.321 V.14.2.1 Mar. 2017 (Year: 2017).*
(Continued)

*Primary Examiner* — Rina C Pancholi
(74) *Attorney, Agent, or Firm* — Fish & Richardson P.C.

(57) ABSTRACT

A method performed by a user equipment (UE) in a wireless communication system, the method including: selecting to create a configured sidelink grant corresponding to transmissions of at least one media access control (MAC) protocol data unit (PDU); and triggering a transmission carrier selection procedure based on (i) data being available in a sidelink traffic channel (STCH) associated with one or more carriers, and (ii) there being no configured sidelink grant on any carrier, among the one or more carriers, that is allowed for the STCH.

17 Claims, 6 Drawing Sheets

Related U.S. Application Data

(60) Provisional application No. 62/668,772, filed on May 8, 2018.

(51) Int. Cl.
  *H04W 72/0453* (2023.01)
  *H04W 72/14* (2009.01)
  *H04W 92/18* (2009.01)
  *H04W 76/27* (2018.01)
  *H04L 1/00* (2006.01)
  *H04W 36/08* (2009.01)
  *H04W 4/40* (2018.01)

(52) U.S. Cl.
  CPC ....... *H04W 72/02* (2013.01); *H04W 72/0453* (2013.01); *H04W 72/14* (2013.01); *H04W 76/27* (2018.02); *H04W 92/18* (2013.01)

(58) Field of Classification Search
  CPC . H04W 72/0453; H04W 72/14; H04W 76/27; H04W 80/02; H04W 92/18; H04W 36/03; H04W 76/14
  See application file for complete search history.

(56) References Cited

U.S. PATENT DOCUMENTS

| | | | |
|---|---|---|---|
| 2017/0257876 | A1 | 9/2017 | Loehr et al. |
| 2019/0387377 | A1* | 12/2019 | Zhang ................. H04W 84/005 |
| 2020/0045719 | A1 | 2/2020 | Wang et al. |
| 2020/0205165 | A1* | 6/2020 | Huang .................. H04L 1/1861 |
| 2020/0229194 | A1* | 7/2020 | Belleschi ............. H04L 5/0064 |
| 2020/0236600 | A1* | 7/2020 | Hong ................ H04W 72/0453 |

FOREIGN PATENT DOCUMENTS

| | | |
|---|---|---|
| WO | WO 2018/030832 | 2/2018 |
| WO | WO18062857 | 4/2018 |
| WO | 3522629 | 8/2019 |

OTHER PUBLICATIONS

3GPP TS 36.321, "3rd Generation Partnership Project; Technical Specification Group Radio Access Network; Evolved Universal Terrestrial Radio Access (E-UTRA); Medium Access Control (MAC) protocol specification (Release 15)," V15.5.0, dated Feb. 2019, 131 pages.

$3^{rd}$ Generation Partnership Project, "Technical Specification Group Radio Access Network; Evolved Universal Terrestrial Radio Acces (E-UTRA) and Evolved Universal Terrestrial Radio Access Network (E-UTRAN); Overall Description; Stage 2 (Release 15)," 3GPP TS 36.300 V15.0.0, dated Dec. 2017, 22 pages.

$3^{rd}$ Generation Partnership Project; "Technical Specification Group Radio Access Network; Evolved Universal Terrestrial Radio Access (E-UTRA); Medium Access Control (MAC) protocol specification (Release 14)," 3GPP TS 36.321, V14.5.0, dated Dec. 2017.

$3^{rd}$ Generation Partnership Project; Technical Specification Group Radio Access Network, "Evolved Universal Terrestrial Radio Access (E-UTRA); Medium Access Control (MAC) protocol specification (Release 14)," 3GPP TS 36.321, Dec. 2017, 109 pages.

$3^{rd}$ Generation Partnership Projects, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300, V15.1.0, dated Mar. 2018, 20 pages.

Ericsson, "Analysis of Existing Resources Reselection Triggering Conditions," Tdoc R2-1805721, 3GPP TSG-RAN WG2 #101-BIS, Sanya, China, Apr. 16-20, 2018, 9 pages.

Ericsson, "MAC Impact of UE Capability Limitation in TX Carrier Selection," R2-1805731, 3GPP TSG RAN WG2 #101bis, Sanya, China, Apr. 16-20, 2018, 6 pages.

Extended European Search Report in European Appln. No. 19800811. 2, dated Jan. 12, 2021, 11 pages.

Huawei, HiSilicon, "Consideration on resource allocation for PC5 CA," R2-1804635, 3GPP TSG-RAN WG2 Meeting #101bis, Sanya, China, Apr. 16-20, 2018, 6 pages.

LG Electronics Inc., "Draft running CR of 36.321 for eV2X," R2-1806027, 3GPP TSG RAN2 Meeting #101bis, Sanya, China, Apr. 16-20, 2018, 12 pages.

LG Electronics Inc., "eV2X clean-up in TS 36.321," R2-1812860, Change Request, Presented at 3GPP TSG-RAN2 Meeting #103, Gothenburg, Sweden, Aug. 20-24, 2018, 10 pages.

LTE-V for Sidelink, "5G V2X Vehicular Communications," IEEE Vehicluar Technology Magazine, dated Dec. 2017.

Office Action in Japanese Appln. No. 2020-542302, dated Aug. 17, 2021, 8 pages (with English translation).

Office Action in Japanese Appln. No. 2020-542302, dated Dec. 21, 2021, 10 pages (with English translation).

PCT International Search Report in International Appln No. PCT/KR2019/005417, dated Aug. 19, 2019, 3 pages.

ZTE, "Discussion on remaining issues of earner selection/reselection," R2-1804510, 3GPP TSG RAN WG2 Meeting #101bis, Sanya, China, dated Apr. 16-20, 2018, 7 pages.

Chinese Office Action in CN Patent Application No. 201980005036. X, dated Feb. 1, 2023, 15 pages (with English translation).

\* cited by examiner

METHOD AND APPARATUS FOR TRIGGERING TRANSMISSION CARRIER SELECTION IN WIRELESS COMMUNICATION SYSTEM

CROSS-REFERENCE TO RELATED APPLICATIONS

This application is a continuation of U.S. application Ser. No. 16/406,599, filed on May 8, 2019, which claims the benefit pursuant to 35 U.S.C. § 119 (e) of U.S. Provisional Application No. 62/668,772, filed on May 8, 2018, the contents of which are all hereby incorporated by reference herein in their entirety.

TECHNICAL FIELD

The present disclosure generally relates to wireless communications.

BACKGROUND

Wireless communication systems generally aim to reduce costs for users and providers, improve service quality, and expand and improve coverage and system capacity. To achieve these goals, in some scenarios, wireless communication systems are designed to reduced cost per bit, increased service availability, flexible use of a frequency band, a simple structure, an open interface, and adequate power consumption of a terminal as an upper-level requirement.

SUMMARY

Implementations are disclosed herein that enable triggering a transmission carrier selection in a wireless communication system.

One general aspect includes a method performed by a user equipment (UE) in a wireless communication system, the method including: selecting to create a configured sidelink grant corresponding to transmissions of at least one media access control (MAC) protocol data unit (PDU). The method also includes triggering a transmission carrier selection procedure based on (i) data being available in a sidelink traffic channel (STCH) associated with one or more carriers, and (ii) there being no configured sidelink grant on any carrier, among the one or more carriers, that is allowed for the STCH. Other embodiments of this aspect include corresponding computer systems, apparatus, and computer programs recorded on one or more computer storage devices, each configured to perform the actions of the methods.

Implementations may include one or more of the following features. The method where the method is performed by a MAC entity of the UE. The method where the MAC entity of the UE is configured by an upper layer of the UE to transmit using pools of resources in the one or more carriers based on sensing, or partial sensing, or random selection. The method where the upper layer of the UE is a radio resource control (RRC) layer of the UE. The method where the data being available in the STCH associated with the one or more carriers and there being no configured sidelink grant on any carrier allowed for the STCH indicates that the data available in the STCH is not associated with a selected carrier among the one or more carriers. The method where an association between the STCH and the one or more carriers is configured by at least one of a network or a pre-configuration. The method where the STCH is allowed to be transmitted in at least one carrier among the one or more carriers based on at least one of a channel busy ratio (CBR) or a proximity-based services (ProSe) per-packet priority (PPPP) of the STCH. The method further including: transmitting the STCH in at least one carrier, among the at least one carrier, transmission carrier selection procedure. Implementations of the described techniques may include hardware, a method or process, or computer software on a computer-accessible medium.

Another general aspect includes a user equipment (UE) configured to operate in a wireless communication system, the UE including: a transceiver. The user equipment also includes at least one memory; and at least one processor operably connectable to the at least one memory and storing instructions that, when executed by the at least one processor, perform operations including: selecting to create a configured sidelink grant corresponding to transmissions of at least one media access control (MAC) protocol data unit (PDU). The user equipment where the operations also include triggering a transmission carrier selection procedure based on (i) data being available in a sidelink traffic channel (STCH) associated with one or more carriers, and (ii) there being no configured sidelink grant on any carrier, among the one or more carriers, that is allowed for the STCH. Other embodiments of this aspect include corresponding computer systems, apparatus, and computer programs recorded on one or more computer storage devices, each configured to perform the actions of the methods.

Implementations may include one or more of the following features. The UE where the operations are performed by a MAC entity of the UE. The UE where the MAC entity of the UE is configured by an upper layer of the UE to transmit using pools of resources in the one or more carriers based on sensing, or partial sensing, or random selection. The UE where the upper layer of the UE is a radio resource control (RRC) layer of the UE. The UE where the data being available in the STCH associated with the one or more carriers and there being no configured sidelink grant on any carrier allowed for the STCH indicates that the data available in the STCH is not associated with a selected carrier among the one or more carriers. The UE where an association between the STCH and the one or more carriers is configured by at least one of a network or a pre-configuration. The UE where the STCH is allowed to be transmitted in at least one carrier among the one or more carriers based on at least one of a channel busy ratio (CBR) or a proximity-based services (ProSe) per-packet priority (PPPP) of the STCH. The UE where the operations further include: transmitting, via the at least one transceiver, the STCH in at least one carrier, among the at least one carrier, transmission carrier selection procedure. Implementations of the described techniques may include hardware, a method or process, or computer software on a computer-accessible medium.

Another general aspect includes an apparatus including: at least one memory; and at least one processor operably connectable to the at least one memory and storing instructions that, when executed by the at least one processor, perform operations including: selecting to create a configured sidelink grant corresponding to transmissions of at least one media access control (MAC) protocol data unit (PDU). The apparatus where the operations also include triggering a transmission carrier selection procedure based on (i) data being available in a sidelink traffic channel (STCH) associated with one or more carriers, and (ii) there being no configured sidelink grant on any carrier, among the one or more carriers, that is allowed for the STCH.

Other embodiments of this aspect include corresponding computer systems, apparatus, and computer programs recorded on one or more computer storage devices, each configured to perform the actions of the methods.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
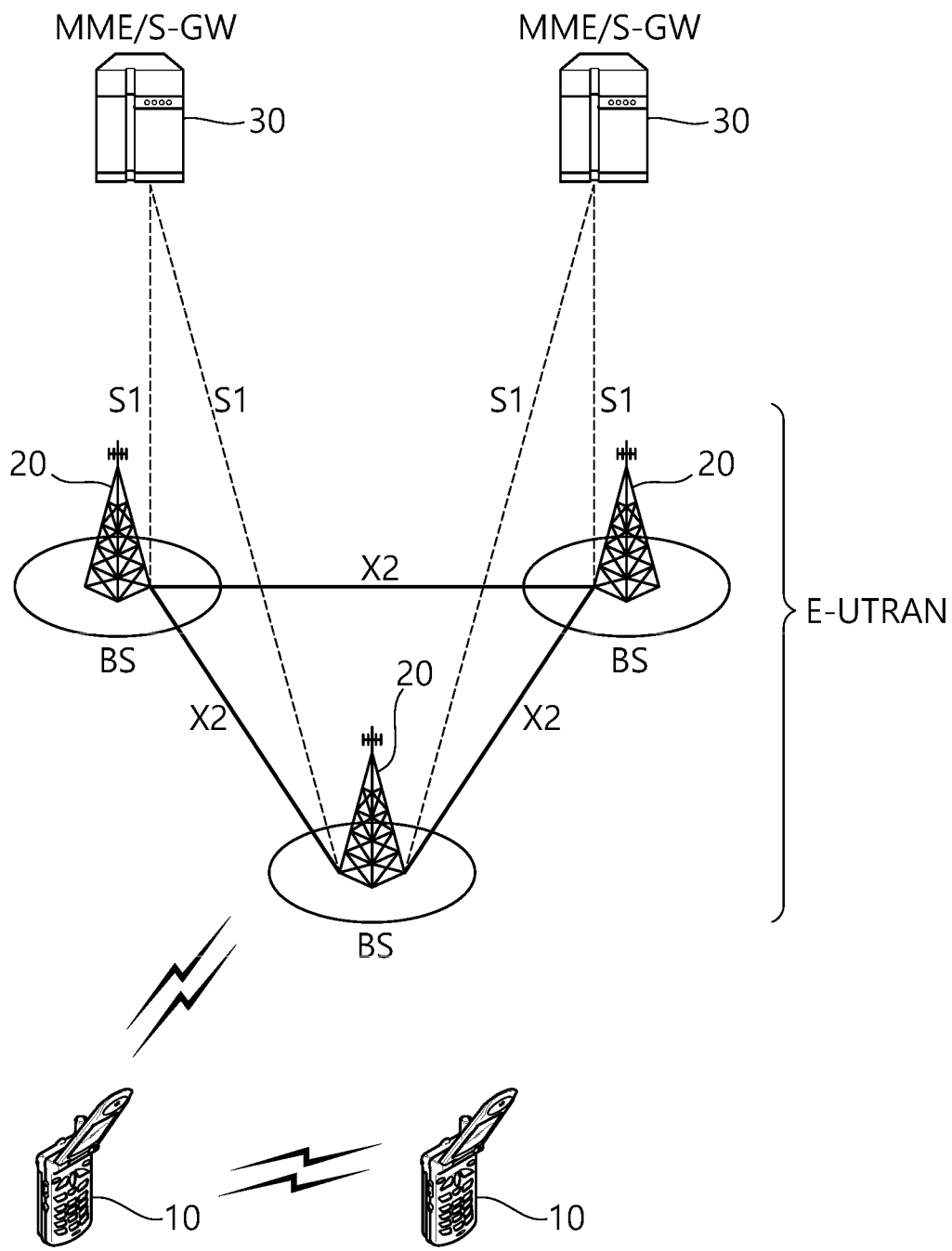
FIG. 1 shows an example of a wireless communication system to which technical features of the present disclosure can be applied.

Vehicle-to-everything (V2X) communication is the communication of information from a vehicle to an entity that may affect the vehicle, and vice versa. Examples of V2X include vehicle-to-infrastructure (V2I), vehicle-to-network (V2N), vehicle-to-vehicle (V2V), vehicle-to-pedestrian (V2P), vehicle-to-device (V2D), and vehicle-to-grid (V2G).

V2X systems may be designed to achieve various objectives, such as road safety, traffic efficiency, and energy savings. V2X communication technology may be classified into two types, depending on the underlying technology: wireless local area network (WLAN)-based V2X, and cellular-based V2X.

In some V2X systems, V2X sidelink communication may be supported. Furthermore, some V2X sidelink communications may support carrier aggregation (CA). In scenarios where V2X sidelink communication implements CA, during actual transmission, a carrier may be initially selected or may be re-selected among the aggregated carriers. There may be various conditions for triggering carrier (re-)selection in such V2X sidelink CA scenarios. In some scenarios, conditions for triggering sidelink resource selection may be used as conditions for triggering transmission carrier (re-) selection. However, other types of triggering conditions may be implemented for transmission carrier (re-)selection.

Implementations are disclosed herein that enable new types of triggering conditions for transmission carrier selection in a wireless communication system. According to some implementation of the present disclosure, new triggering conditions for TX carrier (re-)selection are implemented. For example, a new triggering condition may be implemented such that (i) even if an upper layer configures multiple carriers for a first V2X service and the MAC entity selects a carrier among those multiple configured carriers, and (ii) if new data for a second V2X service is available in a logical channel which is not associated with that currently selected carrier, then the TX carrier (re-)selection is triggered and a new carrier for the second V2X service may be selected.

The 3rd generation partnership project (3GPP) long-term evolution (LTE) is a technology designed to enable high-speed packet communications. In addition, the international telecommunication union (ITU) and 3GPP have developed technical standards for new radio (NR) systems. In doing so, technology is being identified and developed to successfully standardize the new radio access technology (RAT), in order to timely satisfy both urgent market needs, as well as longer-term goals and requirements set forth by the ITU radio communication sector (ITU-R) international mobile telecommunications (IMT)-2020 process. In some scenarios, NR is being designed to use any spectrum band ranging at least up to 100 GHz, which may be made available for wireless communications even in a more distant future.

The NR targets a technical framework addressing various usage scenarios, requirements, and deployment scenarios, such as, for example, enhanced mobile broadband (eMBB), massive machine-type-communications (mMTC), ultra-reliable and low latency communications (URLLC), etc.

In some systems, one or more technical features described below may be compatible with one or more technical standards, such as those used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/ or 5G new radio (NR). The communication standard by the IEEE standardization organization includes a wireless local area network (WLAN) system such as IEEE 802.11a/b/g/n/ ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

FIG. 1 shows an example of a wireless communication system to which technical features of the present disclosure can be applied. In some scenarios, the system of FIG. 1 may be compatible with an evolved-UMTS terrestrial radio access network (E-UTRAN). LTE may be a part of an evolved-UTMS (e-UMTS) using the E-UTRAN.

Referring to FIG. 1, the wireless communication system includes one or more user equipment (UE; 10), an E-UTRAN and an evolved packet core (EPC). As an example, the UE 10 may be a communication equipment carried by a user. The UE 10 may be fixed or mobile. The UE 10 may be referred to by various terminologies, such as a mobile station (MS), a user terminal (UT), a subscriber station (SS), a wireless device, etc.

The E-UTRAN consists of one or more base stations (BSs), such as BS 20. The BS 20 provides the E-UTRA user plane and control plane protocol terminations towards the UE 10. In some implementations, the BS 20 may be a fixed station that communicates with the UE 10. The BS 20 may host various functions, such as, for example, inter-cell radio resource management (MME), radio bearer (RB) control, connection mobility control, radio admission control, measurement configuration/provision, dynamic resource allocation (scheduler), etc. The BS may be referred to using various terminologies, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts various functions, such as, for example, non-access stratum (NAS) security, idle state mobility handling, evolved packet system (EPS) bearer control, etc. The S-GW hosts various functions, such as, for example, mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts various functions, such as, for example, UE Internet protocol (IP) address allocation, packet filtering, etc. The P-GW is a gateway having a PDN as an endpoint. The P-GW is connected to an external network.

The UE 10 is connected to the BS 20 by an interface, such as the Uu interface. The UEs 10 are interconnected with each other by an interface, such as the PC5 interface. The BSs 20 are interconnected with each other by an interface, such as the X2 interface. The BSs 20 are also connected by the S1 interface to the EPC, more specifically may be connected to the MME by the S1-MME interface and may be connected to the S-GW by the S1-U interface. In some implementations, the S1 interface supports a many-to-many relation between MMEs, S-GWs, and BSs.

Figure 2:
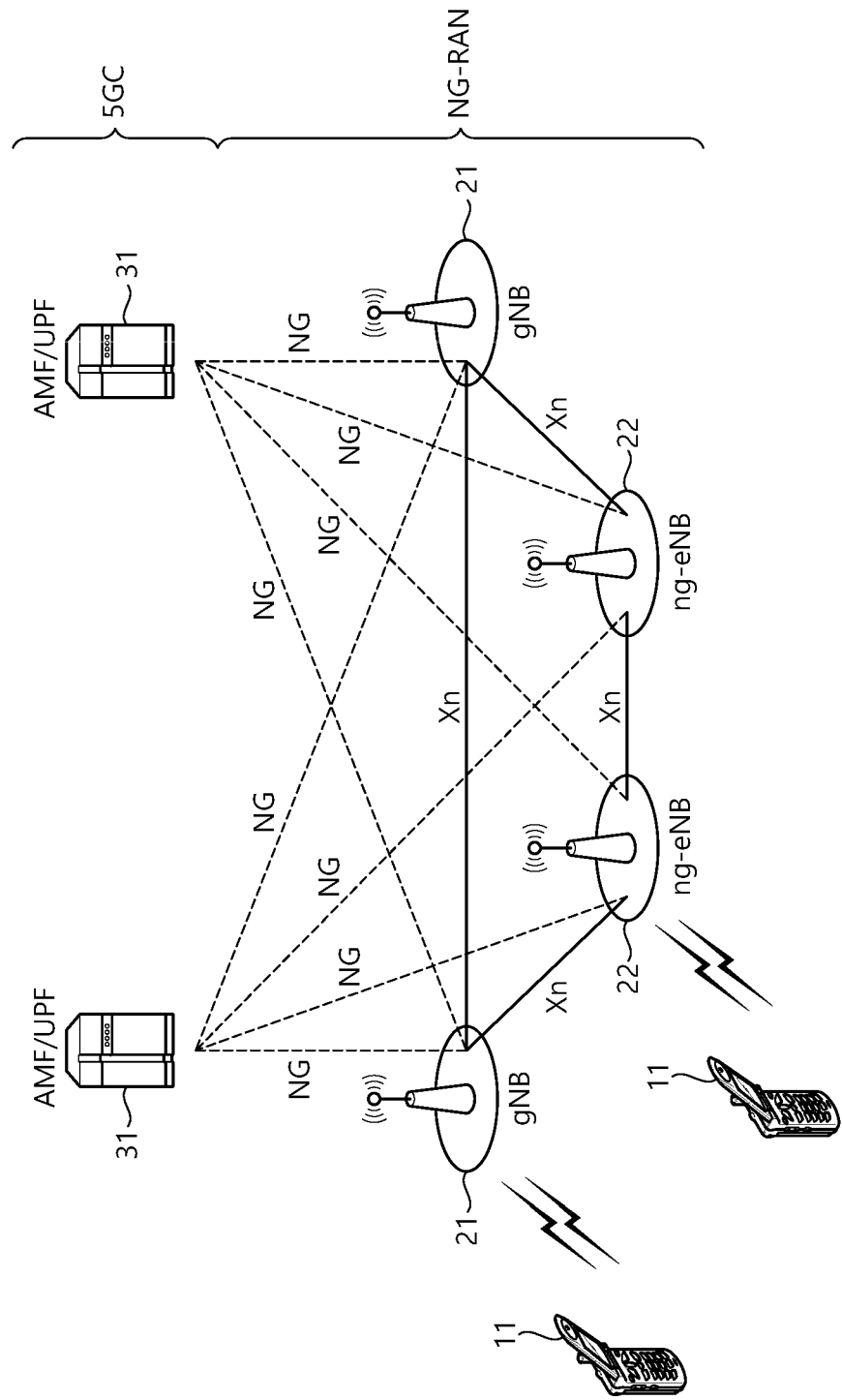
FIG. 2 shows another example of a wireless communication system to which technical features of the present disclosure can be applied.

FIG. 2 shows another example of a wireless communication system to which technical features of the present disclosure can be applied. Specifically, FIG. 2 shows a system architecture based on a 5G new radio access technology (NR) system. The entity used in the 5G NR system (hereinafter, simply referred to as "NR") may implement some or all of the functions of the entities introduced in FIG. 1 (e.g., the eNB, MME, S-GW). The entity used in the NR system may be identified by the name "NG."

Referring to FIG. 2, the wireless communication system includes one or more UE 11, a next-generation RAN (NG-RAN) and a 5th generation core network (5GC). The NG-RAN consists of at least one NG-RAN node. The NG-RAN node may be, for example, an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts various functions, such as, for example, NAS security, idle state mobility handling, etc. The AMF hosts various functions, such as, for example, non-access stratum (NAS) security, idle state mobility handling, evolved packet system (EPS) bearer control, etc. The UPF hosts various functions, such as, for example, mobility anchoring, protocol data unit (PDU) handling. The UPF hosts various functions, such as, for example, mobility anchoring, etc. The SMF hosts various functions, such as, for example, UE IP address allocation, PDU session control, etc.

The gNBs and ng-eNBs are interconnected with each other by an interface, such as the Xn interface. The gNBs and ng-eNBs are also connected by NG interfaces to the 5GC, for example, to the AMF by the NG-C interface and to the UPF by the NG-U interface.

An example of a protocol structure between network entities described above is described. In the examples of FIG. 1 and/or FIG. 2, layers of a radio interface protocol between the UE and the network (e.g. NG-RAN and/or E-UTRAN) may be classified into a first layer (L1), a second layer (L2), and a third layer (L3), for example based on the lower three layers of the open system interconnection (OSI) model.

Figure 3:
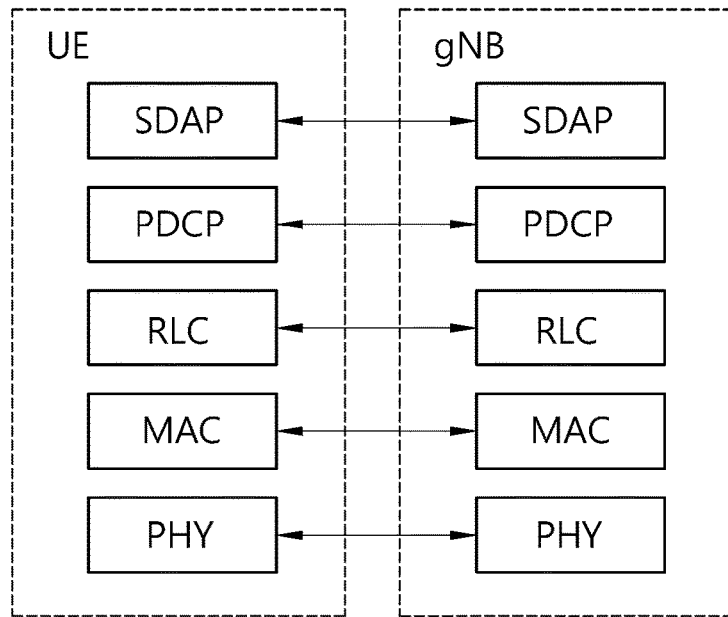
FIG. 3 shows a block diagram of an example of a user plane protocol stack to which technical features of the present disclosure can be applied.
Figure 4:
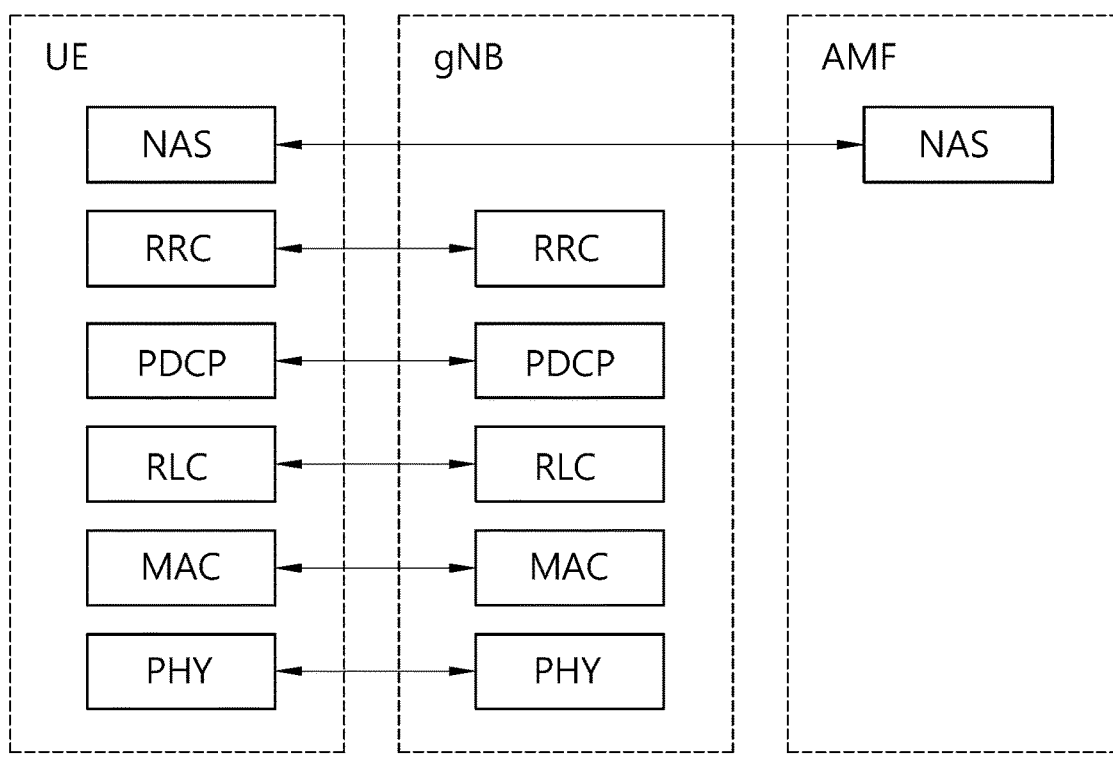
FIG. 4 shows a block diagram of an example of a control plane protocol stack to which technical features of the present disclosure can be applied.

FIG. 3 shows a block diagram of an example of a user plane protocol stack to which technical features of the present disclosure can be applied. FIG. 4 shows a block diagram of an example of a control plane protocol stack to which technical features of the present disclosure can be applied.

Referring to the examples of FIG. 3 and FIG. 4, a physical (PHY) layer belongs to L1. The PHY layer offers information transfer services to the media access control (MAC) sublayer and higher layers. For example, the PHY layer offers transport channels to the MAC sublayer, and data between the MAC sublayer and the PHY layer is transferred via the transport channels. Between different PHY layers, e.g., between a PHY layer of a transmission side and a PHY layer of a reception side, data is transferred via physical channels.

The MAC sublayer belongs to L2. The services and functions of the MAC sublayer include, for example, mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARM), priority handling between UEs by dynamic scheduling, priority handling between logical channels of one UE by logical channel prioritization (LCP), etc. The MAC sublayer offers to the radio link control (RLC) sublayer logical channels.

The RLC sublayer belong to L2. In some implementations, the RLC sublayer supports different transmission modes, e.g., transparent mode (TM), unacknowledged mode (UM), and acknowledged mode (AM). The different transmission modes may help guarantee various quality of services (QoS) required by radio bearers. The services and functions of the RLC sublayer may depend on the transmission mode. For example, in some implementations, the RLC sublayer provides transfer of upper layer PDUs for all three modes, but provides error correction through ARQ for AM only. In some implementations, such as implementations compatible with LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). In some implementations, the NR does not support concatenation of RLC SDUs. The RLC sublayer offers RLC channels to the packet data convergence protocol (PDCP) sublayer.

The PDCP sublayer belongs to L2. The services and functions of the PDCP sublayer for the user plane include, for example, header compression and decompression, transfer of user data, duplicate detection, PDCP PDU routing, retransmission of PDCP SDUs, ciphering and deciphering, etc. The services and functions of the PDCP sublayer for the control plane include, for example, ciphering and integrity protection, transfer of control plane data, etc.

The service data adaptation protocol (SDAP) sublayer belongs to L2. In some implementations, the SDAP sublayer is only defined in the user plane. The services and functions of SDAP include, for example, mapping between a QoS flow and a data radio bearer (DRB), and marking QoS flow ID (QFI) in both DL and UL packets. The SDAP sublayer offers QoS flows to 5GC.

A radio resource control (RRC) layer belongs to L3. In some implementations, the RRC layer is only defined in the control plane. The RRC layer controls radio resources between the UE and the network. For example, the RRC layer exchanges RRC messages between the UE and the BS. The services and functions of the RRC layer include, for example, broadcast of system information related to access stratum (AS) and non-access stratum (NAS), paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

As such, in some implementations, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. In some scenarios, setting the radio bearer may include defining the characteristics of the radio protocol layer and the channel for providing a specific service, and setting each specific parameter and operation method. Radio bearers may include signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In some implementations, such as implementations compatible with LTE/LTE-A, when the RRC connection is established between the RRC layer of the UE and the RRC layer of the E-UTRAN, the UE is in the RRC connected state (RRC_CONNECTED); and otherwise, the UE is in the RRC idle state (RRC_IDLE). In implementations compatible with NR, the RRC inactive state (RRC_INACTIVE) is additionally introduced. The RRC_INACTIVE state may be used for various purposes. For example, in some scenarios, massive machine-type communications (MMTC) UEs can be efficiently managed in RRC_INACTIVE. When specific conditions are satisfied, transitions can be made from one of the above three states to others.

Various operations may be performed according to the RRC state. For example, in RRC_IDLE, operations such as public land mobile network (PLMN) selection, broadcast of system information (SI), cell re-selection mobility, core network (CN) paging and discontinuous reception (DRX) configured by NAS may be performed. The UE may be allocated an identifier (ID) which uniquely identifies the UE in a tracking area. In some implementations, no RRC context is stored in the base station.

As another example, in RRC_CONNECTED, the UE has an RRC connection with the network (i.e. E-UTRAN/NG-RAN). Network-CN connection (both C/U-planes) is also established for UE. In some implementations, the UE AS context is stored in the network and the UE. The RAN knows the cell which the UE belongs to, and the network can transmit and/or receive data to/from UE. In some implementations, network controlled mobility including measurement is also performed.

One or more operations that are performed in RRC_IDLE may also be performed in RRC_INACTIVE. However, in some implementations, instead of performing CN paging as in RRC_IDLE, RAN paging may be performed in RRC_INACTIVE. For example, in RRC_IDLE, paging for mobile terminated (MT) data is initiated by a core network and paging area is managed by the core network. In RRC_INACTIVE, paging may be initiated by NG-RAN, and RAN-based notification area (RNA) is managed by NG-RAN. Further, in some implementations, instead of DRX for CN paging configured by NAS in RRC_IDLE, DRX for RAN paging is configured by NG-RAN in RRC_INACTIVE. In some implementations, in RRC_INACTIVE, 5GC-NG-RAN connection (both C/U-planes) is established for UE, and the UE AS context is stored in NG-RAN and the UE. The NG-RAN may know the RNA which the UE belongs to.

The NAS layer is implemented above the RRC layer, as shown in the example of FIG. 4. The NAS control protocol performs various functions, such as, for example, authentication, mobility management, security control, etc.

Physical channels, for example as utilized by the PHY layer, may be modulated according to various modulation techniques utilizing time and frequency as radio resources. For example, the physical channels may consist of a plurality of orthogonal frequency division multiplexing (OFDM) symbols in time domain and a plurality of subcarriers in frequency domain. A subframe may be implemented, which consists of a plurality of OFDM symbols in the time domain. A resource block may be implemented as a resource allocation unit, and each resource block may consist of a plurality of OFDM symbols and a plurality of subcarriers. In addition, each subframe may use specific subcarriers of specific OFDM symbols (e.g., the first OFDM symbol) of the corresponding subframe for a specific purpose, such as for a physical downlink control channel (PDCCH), e.g., an L1/L2 control channel. A transmission time interval (TTI) may be implemented as a basic unit of time, for example as used by a scheduler for resource allocation. The TTI may be defined in units of one or a plurality of slots, or may be defined in units of mini-slots.

Transport channels may be classified according to how and with what characteristics data are transferred over the radio interface. For example, DL transport channels include a broadcast channel (BCH) used for transmitting system information, a downlink shared channel (DL-SCH) used for transmitting user traffic or control signals, and a paging channel (PCH) used for paging a UE. As another example, UL transport channels include an uplink shared channel (UL-SCH) for transmitting user traffic or control signals and a random access channel (RACH) normally used for initial access to a cell.

Different kinds of data transfer services may be offered by the MAC sublayer. Different logical channel types may be defined by what type of information is transferred. In some implementations, logical channels may be classified into two groups: control channels and traffic channels.

Control channels are used for the transfer of control plane information only, according to some implementations. The control channels may include, for example, a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. In some implementations, the CCCH is used for UEs having no RRC connection with the network. The DCCH is a point-to-point bi-directional channel that transmits dedicated control information between a UE and the network. In some implementations, the DCCH is used by UEs having an RRC connection.

Traffic channels are used for the transfer of user plane information only, according to some implementations. The traffic channels include, for example, a dedicated traffic channel (DTCH). The DTCH is a point-to-point channel, dedicated to one UE, for the transfer of user information. In some implementations, the DTCH can exist in both UL and DL.

In some scenarios, mappings may be implemented between the logical channels and transport channels. For example, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. As another example, in UL, CCCH can be mapped to UL-SCH, DCCH can be mapped to UL-SCH, and DTCH can be mapped to UL-SCH.

Examples of sidelink communication are described next. These techniques may encompass certain aspects of V2X sidelink communication, but are not limited thereto. Sidelink communication in the scenario of V2X communications (V2X sidelink communication) will be provided further below, following the description of more general sidelink communication.

In some implementations, the examples of sidelink communication described below may be compliant with 3GPP technical standard TS 36.300 V15.0.0 (2017 December), Section 23.10. In some scenarios, sidelink communication generally encompasses a UE to UE interface for sidelink communication, vehicle-to-everything (V2X) sidelink communication and sidelink discovery. In some implementations, the sidelink corresponds to the PC5 interface. Sidelink transmissions may be defined for sidelink discovery, sidelink communication, and V2X sidelink communication between UEs. In some implementations, sidelink transmissions use the same frame structure as the frame structure that is defined for UL and DL when UEs are in network coverage. However, in some scenarios, the sidelink transmission may be restricted to a sub-set of the UL resources in the time and frequency domains. Various physical channels, transport channels, and logical channels may be implemented and utilized for sidelink transmission.

In some implementations, sidelink communication is a mode of communication whereby UEs can communicate with each other directly over the PC5 interface. This communication mode is supported when the UE is served by E-UTRAN and when the UE is outside of E-UTRA coverage. In some scenarios, only those UEs authorized to be used for public safety operation can perform sidelink communication. The terminology "sidelink communication" without "V2X" prefix may, in some scenarios, only concern public safety unless specifically stated otherwise.

In order to perform synchronization for out of coverage operation, the UE(s) may act as a synchronization source by transmitting a sidelink broadcast control channel (SBCCH) and a synchronization signal. In some scenarios, SBCCH carries the most essential system information needed to receive other sidelink channels and signals. In some implementations, SBCCH along with a synchronization signal is transmitted with a fixed periodicity of 40 ms. When the UE is in network coverage, the contents of SBCCH may be derived from the parameters signaled by the BS. When the UE is out of coverage, if the UE selects another UE as a synchronization reference, then the content of SBCCH may be derived from the received SBCCH.

Otherwise, in some implementations, the UE uses pre-configured parameters. For example, SIB18 provides the resource information for the synchronization signal and SBCCH transmission. In some scenarios, there are two pre-configured subframes every 40 ms for out of coverage operation. The UE may receive the synchronization signal and SBCCH in one subframe and transmit synchronization signal and SBCCH on another subframe if the UE becomes a synchronization source based on a criterion.

In some implementations, the UE performs sidelink communication on subframes defined over the duration of sidelink control (SC) period. The SC period is the period over which resources allocated in a cell for sidelink control information (SCI) and sidelink data transmissions occur. Within the SC period, the UE sends SCI followed by sidelink data. SCI indicates a Layer 1 ID and characteristics of the transmissions (e.g., modulation and coding scheme (MCS), location of the resource(s) over the duration of SC period, timing alignment).

In some implementations, the UE performs transmission and reception over Uu and PC5 with the following decreasing priority order in case sidelink discovery gap is not configured:

Uu transmission/reception (highest priority);
    PC5 sidelink communication transmission/reception;
    PC5 sidelink discovery announcement/monitoring (lowest priority).

In some implementations, the UE performs transmission and reception over Uu and PC5 with the following decreasing priority order in case sidelink discovery gap is configured:

Uu transmission/reception for RACH;
    PC5 sidelink discovery announcement during a sidelink discovery gap for transmission;

Non-RACH Uu transmission;
PC5 sidelink discovery monitoring during a sidelink discovery gap for reception;
Non-RACH Uu reception;
PC5 sidelink communication transmission/reception.

A UE supporting sidelink communication may, in some implementations, operate in two modes for resource allocation. The first mode is a scheduled resource allocation mode, which may be referred to as "Mode 1" for resource allocation of sidelink communication. In Mode 1, the UE needs to be RRC_CONNECTED in order to transmit data. The UE requests transmission resources from a base station (BS) and the BS schedules transmission resources for transmission of sidelink control information and sidelink data. The UE sends a scheduling request (e.g., a dedicated scheduling request (D-SR) or random access) to the BS followed by a sidelink buffer status report (BSR). Based on the sidelink BSR, the BS may determine that the UE has data for a sidelink communication transmission, and may estimate the resources needed for transmission. The BS may then schedule transmission resources for sidelink communication using a configured sidelink radio network temporary identity (SL-RNTI). Therefore, in such scenarios, a UE that is in the RRC_CONNECTED state and that is to perform a sidelink communication may send a sidelink UE information message to a BS. In response, the BS may configure the UE with a SL-RNTI.

The second mode of resource allocation for sidelink communication is a UE autonomous resource selection mode, which may be referred to as "Mode 2" for resource allocation of sidelink communication. In Mode 2, a UE selects resources from one or more resource pools and performs selection of a transport format to transmit sidelink control information and data. In some scenarios, there may be up to 8 transmission resource pools either pre-configured for out of coverage operation or provided by RRC signaling for in-coverage operation. Each resource pool may have one or more priority levels (e.g., one or more ProSe per-packet priority (PPPP)) associated with it. As an example, for transmission of a MAC PDU, the UE selects a transmission pool in which one of the associated PPPP is equal to the PPPP of a logical channel with highest PPPP among the logical channel identified in the MAC PDU. In some implementations, it is up to UE implementation how the UE selects amongst multiple pools with same associated PPPP. There is a one to one association between sidelink control pool and sidelink data pool. Once the resource pool is selected, in some scenarios, the selection is valid for an entire sidelink control (SC) period. After the SC period is finished, the UE may perform resource pool selection again. The UE is allowed to perform multiple transmissions to different destinations in a single SC period.

Having provided various examples of general sidelink communication above, next, some examples of sidelink communication in the scenario of V2X communications (V2X sidelink communication) are described.

In some implementations, the techniques of V2X sidelink communication described below may be compliant with technical standard 3GPP TS 36.300 V15.1.0 (2018 March), e.g., Section 23.14. In general, V2X services may consist of various types, such as vehicle-to-vehicle (V2V) services, vehicle-to-infrastructure (V2I) services, vehicle-to-nomadic (V2N) services, and vehicle-to-pedestrian (V2P) services.

V2X services may be provided by PC5 interface and/or Uu interface, according to some implementations. Support of V2X services via PC5 interface is provided by V2X sidelink communication, which is a mode of communication whereby UEs communicate with each other directly over the PC5 interface. This communication mode is supported when the UE is served by E-UTRAN and when the UE is outside of E-UTRA coverage. In some implementations, only UEs that are authorized for V2X services may perform V2X sidelink communication.

V2X sidelink communication may implement and utilize a user plane protocol stack and functions for sidelink communication. In addition, according to some implementations of V2X sidelink communication:

Sidelink traffic channel (STCH) for sidelink communication is also used for V2X sidelink communication.

Non-V2X (e.g., public safety related) data is not multiplexed with V2X data transmitted in resources configured for V2X sidelink communication.

The access stratum (AS) is provided with the PPPP of a protocol data unit transmitted over PC5 interface by higher layers. The packet delay budget (PDB) of the protocol data unit can be determined from the PPPP. The low PDB is mapped to the high priority PPPP value.

The existing logical channel prioritization based on PPPP is used for V2X sidelink communication.

Control plane protocol stack for SBCCH for sidelink communication is also used for V2X sidelink communication.

A UE supporting V2X sidelink communication may, in some implementations, operate in two modes for resource allocation. The first mode is a scheduled resource allocation, which may be referred to as "Mode 3" for resource allocation of V2X sidelink communication. In Mode 3, the UE needs to be RRC_CONNECTED in order to transmit data. The UE requests transmission resources from a BS, and the BS schedules transmission resources for transmission of sidelink control information and data. Sidelink semi-persistent scheduling (SPS) is supported for the Mode 3.

The second mode of resource allocation for V2X sidelink communication is a UE autonomous resource selection, which may be referred to as "Mode 4" for resource allocation of V2X sidelink communication. In Mode 4, the UE selects resources from one or more resource pools and performs selection of transport format to transmit sidelink control information and data. In scenarios where mapping between the zones and V2X sidelink transmission resource pools is configured, the UE selects a V2X sidelink resource pool based on the zone in which the UE is located. The UE may perform sensing for selection (or re-selection) of sidelink resources. Based on the sensing results, the UE may select (or re-select) specific sidelink resources and may reserve multiple sidelink resources. In some scenarios, up to 2 parallel independent resource reservation processes are allowed to be performed by the UE. The UE is also allowed to perform a single resource selection for its V2X sidelink transmission.

An RRC_CONNECTED UE may send a sidelink UE information message to the serving cell if it is interested in V2X sidelink communication transmission in order to request sidelink resources.

If the UE is configured by higher layers to receive V2X sidelink communication and V2X sidelink reception resource pools are provided, the UE performs reception on those provided resources.

In some scenarios, reception of sidelink V2X communication in different carriers/PLMNs can may supported by having multiple receiver chains in the UE.

For controlling channel utilization, according to some implementations, the network is able to indicate how the UE adapts its transmission parameters for each transmission pool depending on a measure of congestion on the channel, e.g., a channel busy ratio (CBR). The UE may measure all the configured transmission pools including an exceptional pool. If a pool is (pre)configured such that a UE shall always transmit physical sidelink control channel (PSCCH) and physical sidelink shared channel (PSSCH) in adjacent resource blocks, then the UE measures PSCCH and PSSCH resources together. If a pool is (pre)configured such that a UE may transmit PSCCH and the corresponding PSSCH in non-adjacent resource blocks in a subframe, then PSSCH pool and PSCCH pool are measured separately.

A UE in RRC_CONNECTED may be configured to report CBR measurement results. For CBR reporting, periodic reporting and event triggered reporting are supported. In some implementations, two types of reporting events may be utilized for event-triggered CBR reporting. As one type of reporting event, in scenarios where PSSCH and PSCCH resources are placed non-adjacently, then only PSSCH pool measurement is used for event-triggered CBR reporting. As another type of reporting event, in scenarios where PSSCH and PSCCH resources are placed adjacently, then CBR measurement of both the PSSCH and PSCCH resources is used for event-triggered CBR reporting. In some implementations, CBR event-triggered reporting is triggered by an overloaded threshold and/or a less-loaded threshold. The network may configure which of the transmission pools the UE needs to report.

In some implementations, a UE (regardless of its RRC state) performs transmission parameter adaptation based on the measured CBR. In scenarios where PSSCH and PSCCH resources are placed non-adjacently, only PSSCH pool measurement is used for transmission parameter adaptation. In scenarios where PSSCH and PSCCH resources are placed adjacently, CBR measurement of both the PSSCH and PSCCH resources is used for transmission parameter adaptation. When CBR measurements are not available, default transmission parameters may be used. Examples of adapted transmission parameters include maximum transmission power, range of the number of retransmission per TB, range of PSSCH RB number, range of MCS, and maximum limit on channel occupancy ratio. The transmission parameter adaption may apply to all transmission pools including an exceptional pool.

Sidelink transmission and/or reception resources including an exceptional pool for different frequencies, for both scheduled resource allocation and UE autonomous resource selection, may be provided. The sidelink resources for different frequencies may be provided via dedicated signaling, SIB21 and/or via pre-configuration. The serving cell may indicate to the UE only the frequency on which the UE may acquire the sidelink resource configuration. If multiple frequencies and associated resource information are provided, it is up to UE implementation to select the frequency among the provided frequencies, according to some implementations. In some scenarios, the UE shall not use preconfigured transmission resource if the UE detects a cell providing resource configuration or inter-carrier resource configuration for V2X sidelink communication. Frequencies which may provide V2X sidelink communication resource configuration or cross-carrier configuration may be pre-configured. The RRC_IDLE UE may prioritize the frequency that provides resource configuration for V2X sidelink communication for other carrier during cell reselection.

If a UE supports multiple transmission chains, then the UE may simultaneously transmit on multiple carriers via the PC5 interface. In scenarios where multiple frequencies for V2X are supported, a mapping between V2X service types and V2X frequencies is configured by upper layers. In some implementations, the UE should ensure a V2X service to be transmitted on the corresponding frequency. For Mode 3, the BS may schedule a V2X transmission on a frequency based on the sidelink BSR, in which the UE includes a destination index that is uniquely associated with a frequency reported by the UE to the BS in a sidelink UE information message.

In some implementations, V2X communication may also implement features such as transmission (TX) carrier selection, logical channel prioritization, packet duplication, etc. Hereinafter, various aspects of the present disclosure are described according to implementations of the present disclosure when transmission carrier selection, logical channel prioritization, packet duplication, etc., are considered for V2X communication.

Implementation 1

Conditions for sidelink resource reselection may be used for conditions for TX carrier (re-)selection. As examples, TX carrier (re-)selection may be autonomously triggered according to conditions such as: (i) if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep, or (ii) if neither transmission nor retransmission has been performed by the MAC entity on any resource indicated in the configured sidelink grant during the last second, of (iii) if sl-ReselectAfter is configured and the number of consecutive unused transmission opportunities on resources indicated in the configured sidelink grant is equal to sl-ReselectAfter, or (iv) if there is no configured sidelink grant, or (v) if the configured sidelink grant cannot accommodate a RLC SDU by using the maximum allowed MCS configured by upper layers in maxMCS-PSSCH and the MAC entity selects not to segment the RLC SDU, or (vi) if transmission(s) with the configured sidelink grant cannot fulfil the latency requirement of the data in a sidelink logical channel according to the associated PPPP, and the MAC entity selects not to perform transmission(s) corresponding to a single MAC PDU, or (vii) if a pool of resources is configured or reconfigured by upper layers.

However, in some scenarios, conditions for sidelink resource reselection may not sufficiently cover multiple carrier scenarios and multiple service scenarios. For instance, the MAC entity may be configured by upper layers (e.g., the RRC layer) to transmit using one or multiple pools of resources on multiple carriers, and may perform TX carrier selection among those multiple carriers. In this case, if new data is available in a logical channel which is not associated with the selected carriers, then there may be a risk that TX carrier selection would not be triggered.

As a specific example, consider a scenario where an upper layer configures multiple carriers for a first V2X service, and the MAC entity selects a particular carrier among those multiple configured carriers. If new data for a second V2X service is available in a logical channel which is not associated with the selected particular carrier, then there may be a risk that the MAC entity cannot trigger TX carrier (re-)selection for the second V2X service, because the multiple carriers were already configured by the upper layer. To address such problems, according to some implementations of the present disclosure, TX carrier selection should be performed if there is no configured grant on any carrier allowed for the STCH associated with the sidelink process.

Figure 5:
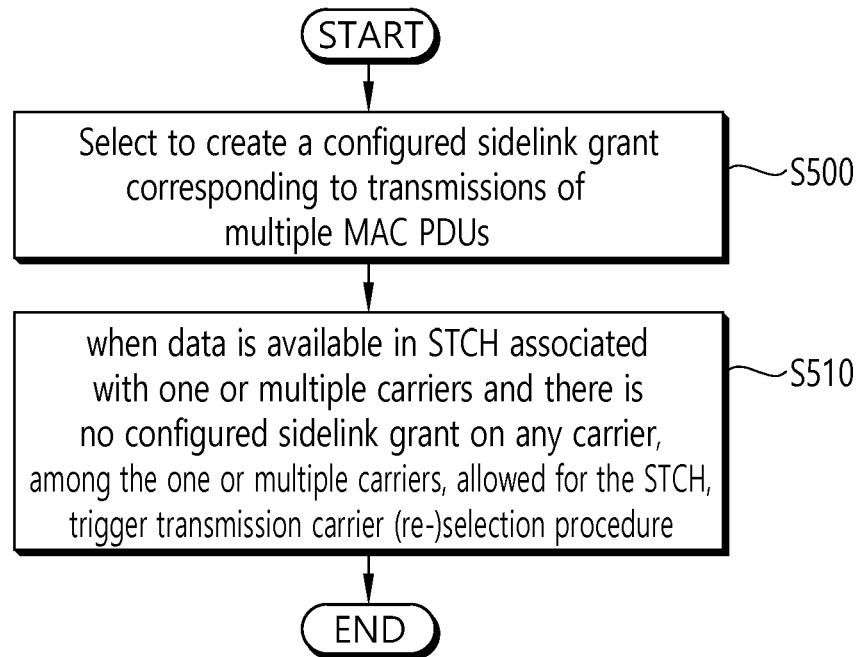
FIG. 5 shows an example of triggering TX carrier (re-) selection according to an implementation of the present disclosure.

FIG. 5 shows an example of triggering TX carrier (re-) selection according to an implementation of the present disclosure. According to this example, a new triggering condition may be implemented for TX carrier (re-)selection.

In step S500, the UE selects to create a configured sidelink grant corresponding to transmissions of multiple MAC PDUs. In step S510, if data is available in a STCH associated with one or multiple carriers and if there is no configured sidelink grant on any carrier, among the one or multiple carriers, allowed for the STCH, then the UE triggers a TX carrier (re-) selection procedure.

The above technique may be performed, for example, by a MAC entity of a UE. The MAC entity may be configured by an upper layer to transmit using pools of resources in the one or multiple carriers based on sensing, or partial sensing, or random selection. The upper layer may be, for example, an RRC layer of the UE.

In scenarios where the data available in the STCH is associated with the one or multiple carriers, and where there is no configured sidelink grant on any carrier allowed for the STCH, then this may indicate that the data available in the STCH is not associated with currently selected carrier among the one or multiple carriers. The association between the STCH and the one or multiple carriers may be configured by a network and/or may be pre-configured. The STCH may be allowed to be transmitted in at least one carrier among the one or multiple carriers based on CBR and/or PPPP of the STCH.

As such, according to the example in FIG. 5, a new triggering condition for TX carrier (re-)selection may be implemented. As a specific example, consider a scenario where an upper layer configures multiple carriers for a first V2X service, and where the MAC entity selects a particular carrier among those multiple carriers. If new data for a second V2X service is available in a logical channel which is not associated with the particular carrier that is selected by the MAC entity, then the TX carrier (re-)selection is triggered, and a new carrier for the second V2X service can be selected.

As an example of such implementations, TX carrier (re-)selection for V2X sidelink communication may be performed as follows. In the following example, it is assumed that each logical channel may be mapped to each carrier or that there may be mapping between carrier(s) and service. The mapping between a logical channel and a carrier may be configured by the network or may be pre-configured. For example, in some implementations, the mapping may be compliant with one or more 3GPP technical standards, e.g., may be configured by the CBR-PPPP table (e.g., SL-CBR-PPPP-TxConfigList) in Rel-14. With this restriction, in a UE, a certain logical channel may be allowed to be transmitted in restricted carriers based on the CBR and the PPPP of the logical channel. The mapping between carriers and services may be configured, for example, by the core network and the upper layer (e.g., a V2X layer), which may provide the mapping information to the AS layer.

In some implementations, the MAC entity may satisfy the following:

1> if the MAC entity is configured by upper layers to transmit using one or multiple pools of resources on multiple carriers and data is available in STCH (e.g., initial TX carrier selection); or 1> if the MAC entity is configured by upper layers to transmit using one or multiple pools (carriers) of resources on multiple carriers and data is available in STCH not associated with currently selected carriers (e.g., the MAC entity is configured by upper layers to transmit using one or multiple pools of resources on multiple carriers due to one or multiple service and data is available in the logical channel which is not mapped to the currently used carriers); or 1> if the MAC entity is configured by upper layers to transmit using one or multiple pools of resources on multiple carriers and new pool is configured in new carrier (e.g., carrier not configured previously);

2> then for each carrier configured by upper layers and for each sidelink logical channel where data is available:

3> if the carrier is associated with the sidelink logical channel; and if the CBR of the carrier measured by lower layers, if CBR measurement results are available, or the corresponding defaultTxConfigIndex configured by upper layers for the carrier, if CBR measurement results are not available is below threshEnteringCarrier associated with the priority of the sidelink logical channel;

4> then consider the carrier as a candidate carrier for TX carrier (re-)selection.

1> else if the MAC entity has been configured by upper layers to transmit using one or multiple pools of resources on multiple carriers, and the TX carrier reselection is triggered for a carrier (i.e. TX carrier reselection):

2> then for each sidelink logical channel mapped to the carrier where data is available;

3> if the CBR of the carrier measured by lower layers if CBR measurement results are available or the corresponding defaultTxConfigIndex configured by upper layers for carrier, if CBR measurement results are not available is above threshLeavingCarrier associated with priority of sidelink logical channel:

4> then consider the carrier as a candidate carrier for TX carrier (re-)selection; 3> else:

4> for each carrier configured by upper layers, if the CBR of the carrier measured by lower layers, if CBR measurement results are available, or the corresponding defaultTxConfigIndex configured by upper layers for the carrier, if CBR measurement results are not available is below threshEnteringCarrier associated with the priority of the sidelink logical channel;

5> then consider the carrier as a candidate carrier for TX carrier (re-)selection.

According to some implementations, the MAC entity may also satisfy the following:

1> if more than one carriers are considered as the candidate carriers for TX carrier (re-) selection, then:

2> select one or more carrier(s) and associated pool(s) of resources among the candidate carriers with increasing order of CBR from the lowest CBR based on the CBR measured by lower layers if CBR measurement results are available, or the corresponding defaultTxConfigIndex configured by upper layers if CBR measurement results are not available;

The UE may, in some implementations, select a limited number of pools of resources based on UE capability. In some scenarios, it may be up to UE implementation in terms of how many carriers to select. Continuing with the above example:

1> else if only one pool of resources is considered as the candidate pool for TX carrier selection or if only one pool of resources is configured by upper layers, then:

2> select the carrier and the associated pool of resources.

As another example of implementations of the present disclosure, sidelink grant selection and/or TX carrier (re-) selection for V2X sidelink communication may be performed as follows.

Sidelink grants may be selected as follows for V2X sidelink communication:

1> if the MAC entity is configured to receive a sidelink grant dynamically on the PDCCH and data is available in STCH, then the MAC entity shall:

2> use the received sidelink grant to determine the number of HARQ retransmissions and the set of subframes in which transmission of SCI and sidelink shared channel (SL-SCH) occur;

2> consider the received sidelink grant to be a configured sidelink grant;

1> if the MAC entity is configured by upper layers to receive a sidelink grant on the PDCCH addressed to SL Semi-Persistent Scheduling V2X RNTI (V-RNTI), then the MAC entity shall for each SL SPS configuration:

2> if PDCCH contents indicate SPS activation, then:

3> use the received sidelink grant to determine the number of HARQ retransmissions and the set of subframes in which transmission of SCI and SL-SCH occur;

3> consider the received sidelink grant to be a configured sidelink grant;

2> if PDCCH contents indicate SPS release, then:

3> clear the corresponding configured sidelink grant;

1> if the MAC entity is configured by upper layers to transmit using pool(s) of resources in one or multiple carriers based on sensing, or partial sensing, or random selection only if upper layers indicates that transmissions of multiple MAC PDUs are allowed, and the MAC entity selects to create a configured sidelink grant corresponding to transmissions of multiple MAC PDUs, and data is available in STCH associated with one or multiple carriers, then the MAC entity shall for each Sidelink process configured for multiple transmissions:

2> if there is no configured sidelink grant on any carrier allowed for the STCH associated with the Sidelink process, then:

3> trigger the TX carrier (re-)selection procedure as specified below;

2> else if there is a configured sidelink grant associated with the Sidelink process, then:

3> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or 3> if neither transmission nor retransmission has been performed by the MAC entity on any resource indicated in the configured sidelink grant during the last second; or 3> if sl-ReselectAfter is configured and the number of consecutive unused transmission opportunities on resources indicated in the configured sidelink grant is equal to sl-ReselectAfter; or 3> if none of the configured sidelink grant(s) on the carrier(s) allowed for the STCH have radio resources available in this TTI to accommodate a RLC SDU by using the maximum allowed MCS configured by upper layers in maxMCS-PSSCH and the MAC entity selects not to segment the RLC SDU; or 3> if none of the configured sidelink grant(s) on the carrier(s) allowed for the STCH have radio resources available in this TTI, to fulfil the latency requirement of the data in a sidelink logical channel according to the associated PPPP, and the MAC entity selects not to perform transmission(s) corresponding to a single MAC PDU; or 3> if the pool of resources where the sidelink grant is configured for the Sidelink process, is reconfigured by upper layers, then:

4> clear the configured sidelink grant;

4> trigger the TX carrier (re-)selection procedure as specified below;

2> if the TX carrier (re-)selection procedure is triggered in above and the carrier is (re-) selected in the TX carrier (re-)selection, then the following is performed on the selected carrier:

3> select one of the allowed values configured by upper layers in restrictResourceReservationPeriod and set the resource reservation interval by multiplying 100 with the selected value;

3> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

3> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

3> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

3> if transmission based on random selection is configured by upper layers, then:

4> randomly select the time and frequency resources for one transmission opportunity from the resource pool, according to the amount of selected frequency resources. The random function shall be such that each of the allowed selections can be chosen with equal probability;

3> else:

4> randomly select the time and frequency resources for one transmission opportunity from the resources indicated by the physical layer, according to the amount of selected frequency resources. The random function shall be such that each of the allowed selections can be chosen with equal probability;

3> use the randomly selected resource to select a set of periodic resources spaced by the resource reservation interval for transmission opportunities of SCI and SL-SCH corresponding to the number of transmission opportunities of MAC PDUs;

3> if the number of HARQ retransmissions is equal to 1 and there are available resources left in the resources indicated by the physical layer that meet the conditions for more transmission opportunities, then:

4> randomly select the time and frequency resources for one transmission opportunity from the available resources, according to the amount of selected frequency resources. The random function shall be such that each of the allowed selections can be chosen with equal probability;

4> use the randomly selected resource to select a set of periodic resources spaced by the resource reservation interval for the other transmission opportunities of SCI and SL-SCH corresponding to the number of retransmission opportunities of the MAC PDUs;

4> consider the first set of transmission opportunities as the new transmission opportunities and the other set of transmission opportunities as the retransmission opportunities;

4> consider the set of new transmission opportunities and retransmission opportunities as the selected sidelink grant.

3> else:

4> consider the set as the selected sidelink grant;

3> use the selected sidelink grant to determine the set of subframes in which transmissions of SCI and SL-SCH occur;

3> consider the selected sidelink grant to be a configured sidelink grant;

2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep, then:

3> clear the configured sidelink grant, if available;

3> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

3> use the previously selected sidelink grant for the number of transmissions of the MAC PDUs with the resource reservation interval to determine the set of subframes in which transmissions of SCI and SL-SCH occur;

3> consider the selected sidelink grant to be a configured sidelink grant;

1> else, if the MAC entity is configured by upper layers to transmit using pool(s) of resources in one or multiple carriers, the MAC entity selects to create a configured sidelink grant corresponding to transmission(s) of a single MAC PDU, and data is available in STCH associated with one or multiple carriers, then the MAC entity shall for a Sidelink process:

2> trigger the TX carrier (re-)selection procedure as specified below;

2> if the carrier is (re-)selected in the TX carrier (re-)selection, then the following is performed on the selected carrier:

3> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

3> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

3> if transmission based on random selection is configured by upper layers, then:

4> randomly select the time and frequency resources for one transmission opportunity of SCI and SL-SCH from the resource pool, according to the amount of selected frequency resources. The random function shall be such that each of the allowed selections can be chosen with equal probability;

3> else:

4> randomly select the time and frequency resources for one transmission opportunity of SCI and SL-SCH from the resources indicated by the physical layer, according to the amount of selected frequency resources. The random function shall be such that each of the allowed selections can be chosen with equal probability;

3> if the number of HARQ retransmissions is equal to 1, then:

4> if transmission based on random selection is configured by upper layers and there are available resources that meet the conditions for one more transmission opportunity, then:

5> randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;

4> else, if transmission based on sensing or partial sensing is configured by upper layers and there are available resources left in the resources indicated by the physical layer that meet the conditions for one more transmission opportunity, then:

5> randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;

4> consider a transmission opportunity which comes first in time as the new transmission opportunity and a transmission opportunity which comes later in time as the retransmission opportunity;

4> consider both of the transmission opportunities as the selected sidelink grant;

3> else:

4> consider the transmission opportunity as the selected sidelink grant;

3> use the selected sidelink grant to determine the subframes in which transmission(s) of SCI and SL-SCH occur;

3> consider the selected sidelink grant to be a configured sidelink grant.

For V2X sidelink communication, according to some implementations, the UE may ensure that the randomly selected time and frequency resources fulfil a latency requirement.

For example, in some implementations, the MAC entity shall, for each subframe:

1> for each configured sidelink grant occurring in this subframe:

2> if SL_RESOURCE_RESELECTION_COUNTER=1 for the Sidelink process associated with the configured sidelink grant and the MAC entity randomly selected, with equal probability, a value in the interval [0, 1] which is above the probability configured by upper layers in probResourceKeep, then:

3> set the resource reservation interval for the configured sidelink grant equal to 0;

2> if the configured sidelink grant corresponds to transmission of SCI, then:

3> for V2X sidelink communication in UE autonomous resource selection:

4> select a MCS which is, if configured, within the range that is configured by upper layers between minMCS-PSSCH and maxMCS-PSSCH included in pssch-TxConfigList and, if configured by upper layers, overlapped between minMCS-PSSCH and maxMCS-PSSCH indicated in cbr-pssch-TxConfigList for the highest priority of the sidelink logical channel(s) in the MAC PDU and the CBR measured by lower layers if CBR measurement results are available or the corresponding defaultTxConfigIndex configured by upper layers if CBR measurement results are not available;

3> for V2X sidelink communication in scheduled resource allocation:

4> select a MCS unless it is configured by upper layer;

3> instruct the physical layer to transmit SCI corresponding to the configured sidelink grant;

3> for V2X sidelink communication, deliver the configured sidelink grant, the associated HARQ information and the value of the highest priority of the sidelink logical channel(s) in the MAC PDU to the Sidelink HARQ Entity for this subframe;

2> else if the configured sidelink grant corresponds to transmission of first transport block for sidelink communication, then:

3> deliver the configured sidelink grant and the associated HARQ information to the Sidelink HARQ Entity for this subframe.

TX carrier (re-)selection for V2X sidelink communication, according to some implementations, is performed as follows. The MAC entity shall consider a CBR of a carrier to be one measured by lower layers if CBR measurement results are available, or the corresponding defaultTxConfigIndex configured by upper layers for the carrier if CBR measurement results are not available.

If the TX carrier (re-)selection is triggered for a Sidelink process, then the MAC entity shall:

1> if there is no configured sidelink grant on any carrier allowed for the sidelink logical channel where data is available, then:

2> for each carrier configured by upper layers associated with the concerned sidelink logical channel:

3> if the CBR of the carrier is below threshCBR-FreqReselection associated with the priority of the sidelink logical channel, then:

4> consider the carrier as a candidate carrier for TX carrier (re-)selection for the concerned sidelink logical channel.

1> else:

2> for each sidelink logical channel allowed on the carrier where data is available and TX carrier (re-)selection is triggered:

3> if the CBR of the carrier is below threshCBR-FreqKeeping associated with priority of sidelink logical channel, then:

4> select the carrier and the associated pool of resources.

3> else:

4> for each carrier configured by upper layers, if the CBR of the carrier is below threshCBR-FreqReselection associated with the priority of the sidelink logical channel;

5> consider the carrier as a candidate carrier for TX carrier (re-)selection.

The MAC entity, according to some implementations, shall satisfy the following:

1> if one or more carriers are considered as the candidate carriers for TX carrier (re-) selection, then:

2> for each sidelink logical channel allowed on the carrier where data is available and TX carrier (re-)selection is triggered, select one or more carrier(s) and associated pool(s) of resources among the candidate carriers with increasing order of CBR from the lowest CBR.

Implementation 2

In some communication systems, the selection of a modulation and coding scheme (MCS) is irrelevant for service. However, in some scenarios, 64 quadrature amplitude modulation (64-QAM) may be applicable for certain services. Accordingly, in some implementations of the present disclosure, the criteria for resource reselection triggering may be modified.

For example, according to an implementation, if the configured sidelink grant cannot accommodate a RLC SDU by using a lower MCS between the maximum allowed MCS configured by upper layers in maxMCS-PSSCH and the maximum allowed MCS of the STCH corresponding to the RLC SDU, and if the MAC entity selects not to segment the RLC SDU, then resource reselection and/or TX carrier (re-)selection may be triggered. If an upper layer does not provide the maximum allowed MCS of the STCH corresponding to the RLC SDU, then the maximum allowed MCS of the STCH corresponding to the RLC SDU may be set to 16QAM. If the configured sidelink grant cannot accommodate the RLC SDU, then according to some implementations, it may be left for UE implementation whether to perform segmentation or sidelink resource reselection.

Alternatively, in some implementations, if 64-QAM is allowed by upper layer configuration for the STCH corresponding to the RLC SDU, and if the configured sidelink grant cannot accommodate a RLC SDU by using 64QAM and the MAC entity selects not to segment the RLC SDU, then the sidelink process configured for multiple transmissions may trigger resource reselection and/or TX carrier (re-)selection. Otherwise, if the configured sidelink grant cannot accommodate a RLC SDU by using the maximum allowed MCS configured by upper layers in maxMCS-PSSCH and if the MAC entity selects not to segment the RLC SDU, then the sidelink process configured for multiple transmissions may trigger resource reselection and/or TX carrier (re-)selection.

As an example implementations of the present disclosure, the MAC entity may operate as follows.

Sidelink grants may be selected on carrier(s) selected as follows for V2X sidelink communication:

1> if the MAC entity is configured to receive a sidelink grant dynamically on the PDCCH and data is available in STCH, then the MAC entity shall:

2> use the received sidelink grant to determine the number of HARQ retransmissions and the set of subframes in which transmission of SCI and SL-SCH occur;

2> consider the received sidelink grant to be a configured sidelink grant;

1> if the MAC entity is configured by upper layers to receive a sidelink grant on the PDCCH addressed to SL Semi-Persistent Scheduling V-RNTI, then the MAC entity shall for each SL SPS configuration:

2> if PDCCH contents indicate SPS activation, then:

3> use the received sidelink grant to determine the number of HARQ retransmissions and the set of subframes in which transmission of SCI and SL-SCH occur;

3> consider the received sidelink grant to be a configured sidelink grant;

2> if PDCCH contents indicate SPS release, then:

3> clear the corresponding configured sidelink grant;

1> if the MAC entity is configured by upper layers to transmit using one or multiple pools of resources based on sensing, or partial sensing, or random selection only if upper layers indicates that transmissions of multiple MAC PDUs are allowed, and the MAC entity selects to create a configured sidelink grant corresponding to transmissions of multiple MAC PDUs, and data is available in STCH associated with one or multiple carriers, then the MAC entity shall for each Sidelink process configured for multiple transmissions on one of the carriers:

2> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or 2> if neither transmission nor retransmission has been performed by the MAC entity on any resource indicated in the configured sidelink grant during the last second; or 2> if sl-ReselectAfter is configured and the number of consecutive unused transmission opportunities on resources indicated in the configured sidelink grant is equal to sl-ReselectAfter; or 2> if there is no configured sidelink grant; or 2> if the configured sidelink grant cannot accommodate a RLC SDU by using a lower MCS between the maximum allowed MCS configured by upper layers in maxMCS-PSSCH and the maximum allowed MCS of the STCH corresponding to the RLC SDU and the MAC entity selects not to segment the RLC SDU; or If the upper layer does not provide the maximum allowed MCS of the STCH corresponding to the RLC SDU, then the maximum allowed MCS of the STCH corresponding to the RLC SDU is set to 16-QAM, according to some implementations. If the configured sidelink grant cannot accommodate the RLC SDU, then according to some implementations, then it is left for UE implementation whether to perform segmentation or sidelink resource reselection.

2> if transmission(s) with the configured sidelink grant cannot fulfil the latency requirement of the data in a sidelink logical channel according to the associated PPPP, and if the MAC entity selects not to perform transmission(s) corresponding to a single MAC PDU; or 2> if a pool of resources is configured or reconfigured by upper layers and a carrier is reselected, then:

3> trigger the TX carrier (re-)selection procedure;

3> clear the configured sidelink grant, if available;

3> select one of the allowed values configured by upper layers in restrictResourceReservationPeriod and set the resource reservation interval by multiplying 100 with the selected value;

3> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

3> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) mapped to the carrier and the CBR measured by lower layers if CBR measurement results are available or the corresponding defaultTxConfigIndex configured by upper layers if CBR measurement results are not available;

3> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) mapped to the carrier and the CBR measured by lower layers if CBR measurement results are available or the corresponding defaultTxConfigIndex configured by upper layers if CBR measurement results are not available;

3> if transmission based on random selection is configured by upper layers, then:

4> randomly select the time and frequency resources for one transmission opportunity from the resource pool, according to the amount of selected frequency resources. The random function shall be such that each of the allowed selections can be chosen with equal probability;

3> else:

4> randomly select the time and frequency resources for one transmission opportunity from the resources indicated by the physical layer, according to the amount of selected frequency resources. The random function shall be such that each of the allowed selections can be chosen with equal probability;

3> use the randomly selected resource to select a set of periodic resources spaced by the resource reservation interval for transmission opportunities of SCI and SL-SCH corresponding to the number of transmission opportunities of MAC PDUs;

3> if the number of HARQ retransmissions is equal to 1 and there are available resources left in the resources indicated by the physical layer that meet the conditions for more transmission opportunities, then:

4> randomly select the time and frequency resources for one transmission opportunity from the available resources, according to the amount of selected frequency resources. The random function shall be such that each of the allowed selections can be chosen with equal probability;

4> use the randomly selected resource to select a set of periodic resources spaced by the resource reservation interval for the other transmission opportunities of SCI and SL-SCH corresponding to the number of retransmission opportunities of the MAC PDUs;

4> consider the first set of transmission opportunities as the new transmission opportunities and the other set of transmission opportunities as the retransmission opportunities;

4> consider the set of new transmission opportunities and retransmission opportunities as the selected sidelink grant.
   3> else:
      4> consider the set as the selected sidelink grant;
   3> use the selected sidelink grant to determine the set of subframes in which transmissions of SCI and SL-SCH occur;
   3> consider the selected sidelink grant to be a configured sidelink grant;
  2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep, then:
      3> clear the configured sidelink grant, if available;
      3> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
      3> use the previously selected sidelink grant for the number of transmissions of the MAC PDUs with the resource reservation interval to determine the set of subframes in which transmissions of SCI and SL-SCH occur;
      3> consider the selected sidelink grant to be a configured sidelink grant;
1> else, if the MAC entity is configured by upper layers to transmit using one or multiple pools of resources, the MAC entity selects to create a configured sidelink grant corresponding to transmission(s) of a single MAC PDU, and data is available in STCH associated with one or multiple carriers, then the MAC entity shall for a Sidelink process on the carrier:
  2> trigger the TX carrier (re-)selection procedure;
  2> select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) mapped to the carrier and the CBR measured by lower layers if CBR measurement results are available or the corresponding defaultTxConfigIndex configured by upper layers if CBR measurement results are not available;
  2> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) mapped to the carrier and the CBR measured by lower layers if CBR measurement results are available or the corresponding defaultTxConfigIndex configured by upper layers if CBR measurement results are not available;
  2> if transmission based on random selection is configured by upper layers, then:
      3> randomly select the time and frequency resources for one transmission opportunity of SCI and SL-SCH from the resource pool, according to the amount of selected frequency resources. The random function shall be such that each of the allowed selections can be chosen with equal probability;
  2> else:
      3> randomly select the time and frequency resources for one transmission opportunity of SCI and SL-SCH from the resource pool indicated by the physical layer, according to the amount of selected frequency resources. The random function shall be such that each of the allowed selections can be chosen with equal probability;
  2> if the number of HARQ retransmissions is equal to 1, then:
      3> if transmission based on random selection is configured by upper layers and there are available resources that meet the conditions for one more transmission opportunity, then:
         4> randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
      3> else, if transmission based on sensing or partial sensing is configured by upper layers and there are available resources left in the resources indicated by the physical layer that meet the conditions for one more transmission opportunity, then:
         4> randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
      3> consider a transmission opportunity which comes first in time as the new transmission opportunity and a transmission opportunity which comes later in time as the retransmission opportunity;
      3> consider both of the transmission opportunities as the selected sidelink grant;
  2> else:
      3> consider the transmission opportunity as the selected sidelink grant;
  2> use the selected sidelink grant to determine the subframes in which transmission(s) of SCI and SL-SCH occur;
  2> consider the selected sidelink grant to be a configured sidelink grant;

For V2X sidelink communication, in some implementations the UE may ensure that the randomly selected time resources and frequency resources fulfill a latency requirement.

For example, for V2X sidelink communication, when a UE randomly selects the time resources and frequency resources or when the UE uses the randomly selected resource to select a set of periodic resources spaced by the resource reservation interval, then the UE should fulfil the following requirement.

According to some implementations, the MAC entity shall satisfy the following, for each subframe:
1> if the MAC entity has a configured sidelink grant occurring in this subframe, then:
  2> if SL_RESOURCE_RESELECTION_COUNTER=1 and the MAC entity randomly selected, with equal probability, a value in the interval [0, 1] which is above the probability configured by upper layers in probResourceKeep, then:

3> set the resource reservation interval equal to 0;
2> if the configured sidelink grant corresponds to transmission of SCI, then:
3> instruct the physical layer to transmit SCI corresponding to the configured sidelink grant;
3> for V2X sidelink communication, deliver the configured sidelink grant, the associated HARQ information and the value of the highest priority of the sidelink logical channel(s) in the MAC PDU to the Sidelink HARQ Entity for this subframe;
2> else if the configured sidelink grant corresponds to transmission of first transport block for sidelink communication, then:
3> deliver the configured sidelink grant and the associated HARQ information to the Sidelink HARQ Entity for this subframe.

In some implementations, hybrid automatic repeat request (HARQ) operations for sidelink communications may be performed as follows. The MAC entity is configured by upper layers to transmit using pool(s) of resources on one or multiple carriers, and there is one sidelink HARQ entity at the MAC entity for each carrier for transmission on SL-SCH, which maintains a number of parallel sidelink processes.

For V2X sidelink communication, in some implementations, the maximum number of transmitting sidelink processes associated with each sidelink HARQ entity is 8. A sidelink process may be configured for transmissions of multiple MAC PDUs. For transmissions of multiple MAC PDUs, the maximum number of transmitting sidelink processes with each sidelink HARQ entity is 2.

In some implementations, a delivered and configured sidelink grant and its associated HARQ information are associated with a sidelink process.

For each subframe of the SL-SCH and each sidelink process, the Sidelink HARQ Entity shall satisfy the following, in some implementations:
1> if a sidelink grant corresponding to a new transmission opportunity has been indicated for this Sidelink process and there is SL data, for sidelink logical channels of ProSe destination associated with this sidelink grant, available for transmission, then:
2> obtain the MAC PDU from the "Multiplexing and assembly" entity;
2> deliver the MAC PDU and the sidelink grant and the HARQ information to this Sidelink process;
2> instruct this Sidelink process to trigger a new transmission.
1> else, if this subframe corresponds to retransmission opportunity for this Sidelink process, then:
2> instruct this Sidelink process to trigger a retransmission.

In some implementations, logical channel prioritization for sidelink may be performed as follows. The logical channel prioritization procedure is applied when a new transmission is performed. Each sidelink logical channel has an associated priority which is the PPPP and also has an associated ProSe per-packet reliability (PPPR). Multiple sidelink logical channels may have the same associated priority. The mapping between priority and LCID may be left for UE implementation. If duplication is activated, then the MAC entity shall map different sidelink logical channels in duplication onto different carriers.

The MAC entity shall, in some implementations, perform the following logical channel prioritization procedure either for each SCI transmitted in an SC period in sidelink communication, or for each SCI corresponding to a new transmission in V2X sidelink communication:
1> The MAC entity shall allocate resources to the sidelink logical channels in the following steps:
2> Only consider sidelink logical channels not previously selected for this SC period and the SC periods (if any) which are overlapping with this SC period, to have data available for transmission in sidelink communication.
2> Only consider sidelink logical channels which are allowed on the carrier where the SCI is transmitted for V2X sidelink communication, if configured by upper layer
2> Exclude sidelink logical channel(s) not mapped to the carrier where the SCI is transmitted, if duplication is activated.
2> Step 0: Select a ProSe Destination, having the sidelink logical channel with the highest priority, among the sidelink logical channels having data available for transmission;
1> For each MAC PDU associated to the SCI:
2> Step 1: Among the sidelink logical channels belonging to the selected ProSe Destination and having data available for transmission, allocate resources to the sidelink logical channel with the highest priority;
2> Step 2: if any resources remain, then sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.
1> the UE shall also follow the rules below during the scheduling procedures above:
2> the UE should not segment an RLC SDU (or partially transmitted SDU) if the whole SDU (or partially transmitted SDU) fits into the remaining resources;
2> if the UE segments an RLC SDU from the sidelink logical channel, then it shall maximize the size of the segment to fill the grant as much as possible;
2> the UE should maximize the transmission of data;
2> if the MAC entity is given a sidelink grant size that is equal to or larger than 10 bytes (for sidelink communication) or 11 bytes (for V2X sidelink communication) while having data available for transmission, the MAC entity shall not transmit only padding.

Implementation 3

In some communication systems, a reliability level (e.g., PPPR) is not considered for buffer status reporting. In such scenarios, an amount of data requiring higher reliability (e.g., data having lower PPPR) and lower priority (e.g., data having higher PPPP) data cannot be reported. Such scenarios may result in problems in which data having higher reliability with lower priority would have a lower chance of being transmitted.

According to an implementation of the present disclosure, data which has a reliability level (e.g., PPPR) that is below (and/or equal to) a threshold reliability level may trigger BSR reporting if SL data, for a sidelink logical channel of a ProSe Destination, becomes available for transmission in the RLC entity or in the PDCP entity, and if either the data belongs to a sidelink logical channel with lower PPPR than the PPPRs of the sidelink logical channels which belong to any LCG belonging to the same ProSe Destination and for which data is already available for transmission, or if there is currently no data available for transmission for any of the sidelink logical channels belonging to the same ProSe Destination.

Alternatively, the data which has a priority level (e.g., PPPP) that is below (and/or equal to) a threshold priority level may trigger BSR reporting if SL data, for a sidelink logical channel of a ProSe Destination, becomes available for transmission in the RLC entity or in the PDCP entity and if the data belongs to a sidelink logical channel with lower PPPR than the PPPRs of the sidelink logical channels which belong to any LCG belonging to the same ProSe Destination and for which data is already available for transmission and lower than (and/or equal to) configured PPPR threshold.

The network may configure the above reliability threshold (e.g., PPPR threshold) and/or priority threshold (e.g., PPPP threshold) for reporting of BSR via dedicated configuration.

As an example of implementations of the present disclosure, buffer status reporting (BSR) for sidelink communication may be performed as follows. The sidelink buffer status reporting procedure is used to provide the serving eNB with information about the amount of sidelink data available for transmission in the SL buffers associated with the MAC entity. In some implementations, the RRC controls BSR reporting for the sidelink by configuring the two timers periodic-BSR-TimerSL and retx-BSR-TimerSL. Each sidelink logical channel belongs to a ProSe Destination. Each sidelink logical channel is allocated to an LCG depending on the priority and optionally the PPPR of the sidelink logical channel, and the mapping between LCG ID and priority and optionally the mapping between LCG ID and PPPR which are provided by upper layers in logicalChGroupInfoList. the LCG is defined per ProSe Destination.

According to some implementations, a sidelink BSR shall be triggered if any of the following events occur:

1> If the MAC entity has a configured SL-RNTI or a configured sidelink V-RNTI (SL-V-RNTI), then:

2> SL data, for a sidelink logical channel of a ProSe Destination, becomes available for transmission in the RLC entity or in the PDCP entity and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";

2> SL data, for a sidelink logical channel of a ProSe Destination, becomes available for transmission in the RLC entity or in the PDCP entity and either the data belongs to a sidelink logical channel with lower PPPR than the PPPRs of the sidelink logical channels which belong to any LCG belonging to the same ProSe Destination and for which data is already available for transmission, or there is currently no data available for transmission for any of the sidelink logical channels belonging to the same ProSe Destination;

2> SL data, for a sidelink logical channel of a ProSe Destination, becomes available for transmission in the RLC entity or in the PDCP entity and the data belongs to a sidelink logical channel with lower PPPR than the PPPRs of the sidelink logical channels which belong to any LCG belonging to the same ProSe Destination and for which data is already available for transmission and lower than (and/or equal to) configured PPPR threshold;

2> UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";

2> retx-BSR-TimerSL expires and the MAC entity has data available for transmission for any of the sidelink logical channels, in which case the Sidelink BSR is referred below to as "Regular Sidelink BSR";

2> periodic-BSR-TimerSL expires, in which case the Sidelink BSR is referred below to as "Periodic Sidelink BSR";

1> else:

2> An SL-RNTI or an SL-V-RNTI is configured by upper layers and SL data is available for transmission in the RLC entity or in the PDCP entity, in which case the Sidelink BSR is referred below to as "Regular Sidelink BSR".

For Regular and Periodic Sidelink BSR:

1> if the number of bits in the UL grant is equal to or larger than the size of a Sidelink BSR containing buffer status for all LCGs having data available for transmission plus its subheader, then:

2> report Sidelink BSR containing buffer status for all LCGs having data available for transmission;

1> else report Truncated Sidelink BSR containing buffer status for as many LCGs having data available for transmission as possible, taking the number of bits in the UL grant into consideration.

For Padding Sidelink BSR:

1> if the number of padding bits remaining after a Padding BSR has been triggered is equal to or larger than the size of a Sidelink BSR containing buffer status for all LCGs having data available for transmission plus its subheader, then:

2> report Sidelink BSR containing buffer status for all LCGs having data available for transmission;

1> else report Truncated Sidelink BSR containing buffer status for as many LCGs having data available for transmission as possible, taking the number of bits in the UL grant into consideration.

If the Buffer Status reporting procedure determines that at least one Sidelink BSR has been triggered and not cancelled, then:

1> if the MAC entity has UL resources allocated for new transmission for this TTI and the allocated UL resources can accommodate a Sidelink BSR MAC control element plus its subheader as a result of logical channel prioritization, then:

2> instruct the Multiplexing and Assembly procedure to generate the Sidelink BSR MAC control element(s);

2> start or restart periodic-BSR-TimerSL except when all the generated Sidelink BSRs are Truncated Sidelink BSRs;

2> start or restart retx-BSR-TimerSL;

1> else if a Regular Sidelink BSR has been triggered, then:

2> if an uplink grant is not configured, then:

3> a Scheduling Request shall be triggered.

A MAC PDU shall, in some implementations, contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

In some implementations, the MAC entity shall restart retx-BSR-TimerSL upon reception of an SL grant.

All triggered regular Sidelink BSRs shall be cancelled in case the remaining configured SL grant(s) valid for this SC Period can accommodate all pending data available for transmission in sidelink communication or in case the remaining configured SL grant(s) valid can accommodate all pending data available for transmission in V2X sidelink communication. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.

In some implementations, the MAC entity shall transmit at most one Regular/Periodic Sidelink BSR in a TTI. If the MAC entity is requested to transmit multiple MAC PDUs in a TTI, then it may include a padding Sidelink BSR in any of the MAC PDUs which do not contain a Regular/Periodic Sidelink BSR.

All Sidelink BSRs transmitted in a TTI, according to some implementations, always reflect the buffer status after all MAC PDUs have been built for this TTI. Each LCG shall report at the most one buffer status value per TTI and this value shall be reported in all Sidelink BSRs reporting buffer status for this LCG.

A Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.

The MAC header for SL-SCH according to an implementation of the present disclosure is as follows. The MAC header is of variable size and consists of the following fields:

V: The MAC PDU format version number field indicates which version of the SL-SCH subheader is used. Three format versions are defined, and this field shall therefore be set to "0001", "0010", and "0011". If the DST field is 24 bits this field shall be set to "0011". The V field size is 4 bits;

SRC: The Source Layer-2 ID field carries the identity of the source. It is set to the ProSe UE ID. The SRC field size is 24 bits;

DST: The DST field can be 16 bits or 24 bits. If it is 16 bits, it carries the 16 most significant bits of the Destination Layer-2 ID. If it is 24 bits, it is set to the Destination Layer-2 ID. For sidelink communication, the Destination Layer-2 ID is set to the ProSe Layer-2 Group ID or Prose UE ID. For V2X sidelink communication, the Destination Layer-2 ID is set to the identifier provided by upper layers. If the V field is set to "0001", this identifier is a groupcast identifier. If the V field is set to "0010", this identifier is a unicast identifier;

LCD: The logical channel ID field uniquely identifies the logical channel instance within the scope of one Source Layer-2 ID and Destination Layer-2 ID pair of the corresponding MAC SDU or padding as described in Table 1 below. There is one LCID field for each MAC SDU or padding included in the MAC PDU. In addition to that, one or two additional LCID fields are included in the MAC PDU, when single-byte or two-byte padding is required but cannot be achieved by padding at the end of the MAC PDU. The values of LCID from '01011' to '10100' identify the logical channels used to send duplicated MAC SDUs from logical channels of which the values of LCID from '00001' to '01010' respectively in sequential order. The LCID field size is 5 bits;

TABLE 1

| Index | LCID values |
|---|---|
| 00000 | Reserved |
| 00001-01010 | Identity of the logical channel |
| 01011-10100 | Identity of the logical channel which is used for duplication |

TABLE 1-continued

| Index | LCID values |
|---|---|
| 10101-11011 | Reserved |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

L: The Length field indicates the length of the corresponding MAC SDU in bytes. There is one L field per MAC PDU subheader except for the last subheader. The size of the L field is indicated by the F field;

F: The Format field indicates the size of the Length field as indicated in Table 2 below. There is one F field per MAC PDU subheader except for the last subheader. The size of the F field is 1 bit. If the size of the MAC SDU is less than 128 bytes, then the value of the F field is set to 0, otherwise it is set to 1;

TABLE 2

| Index | Size of Length field (in bits) |
|---|---|
| 0 | 7 |
| 1 | 15 |

E: The Extension field is a flag indicating if more fields are present in the MAC header or not. The E field is set to "1" to indicate another set of at least R/R/E/LCID fields. The E field is set to "0" to indicate that either a MAC SDU or padding starts at the next byte;

R: Reserved bit, set to "0".

The MAC header and subheaders are octet aligned.

Figure 6:
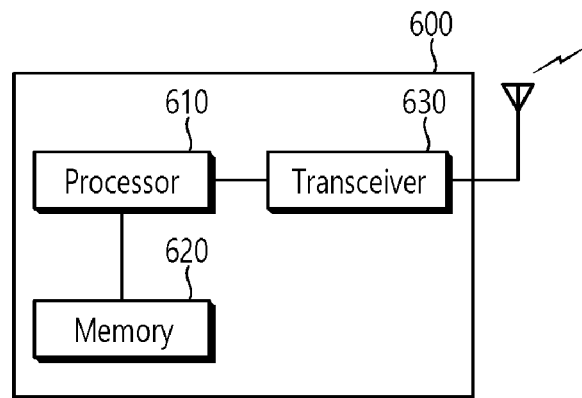
FIG. 6 shows an example of a user equipment (UE) according implementations of the present disclosure.

FIG. 6 shows an example of a UE according to some implementations of the present disclosure. The examples of the present disclosure described above for UE side may be applied to this implementation. Specifically, this implementation may implement the implementation 1 described above.

A UE 600 includes at least one processor such as processor 610, at least one memory such as memory 620 and a transceiver 630. The processor 610 may be configured to implement proposed functions, procedures and/or methods described in this description. Layers of the radio interface protocol may be implemented in the processor 610.

Specifically, the processor 610 is configured to select to create a configured sidelink grant corresponding to transmissions of multiple MAC PDUs. When data is available in a STCH associated with one or multiple carriers and there is no configured sidelink grant on any carrier, among the one or multiple carriers, allowed for the STCH, the processor 610 is configured to trigger TX carrier (re-)selection procedure.

The processor 610 may include a MAC entity. The MAC entity may be configured by an upper layer to transmit using pools of resources in the one or multiple carriers based on sensing, or partial sensing, or random selection. The upper layer may be RRC layer of the UE.

That the data is available in the STCH associated with the one or multiple carriers and there is no configured sidelink grant on any carrier allowed for the STCH may indicate that the data is available in the STCH not associated with currently selected carrier among the one or multiple carriers. The association between the STCH and the one or multiple carriers may be configured by a network and/or pre-configured. The STCH may be allowed to be transmitted in at least one carrier among the one or multiple carriers based on CBR and/or PPPP of the STCH.

The memory 620 is operatively coupled with the processor 610 and stores a variety of information to operate the processor 610. The transceiver 630 is operatively coupled with the processor 610, and transmits and/or receives a radio signal.

The processor 610 may include application-specific integrated circuit (ASIC), other chipset, logic circuit and/or data processing device. The memory 620 may include read-only memory (ROM), random access memory (RAM), flash memory, memory card, storage medium and/or other storage device. The transceiver 630 may include baseband circuitry to process radio frequency signals. When the implementations are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various techniques as is known in the art.

According to implementation of the present disclosure shown in FIG. 6, the new triggering condition TX carrier (re-)selection can be added. More specifically, even if upper layer configures multiple carriers for a first V2X service and MAC entity selects a carrier among the multiple carriers, and when new data for a second V2X service is available in a logical channel which is not associated with currently selected carrier, the TX carrier (re-)selection can be triggered, and a new carrier for the second V2X service can be selected.

Figure 7:
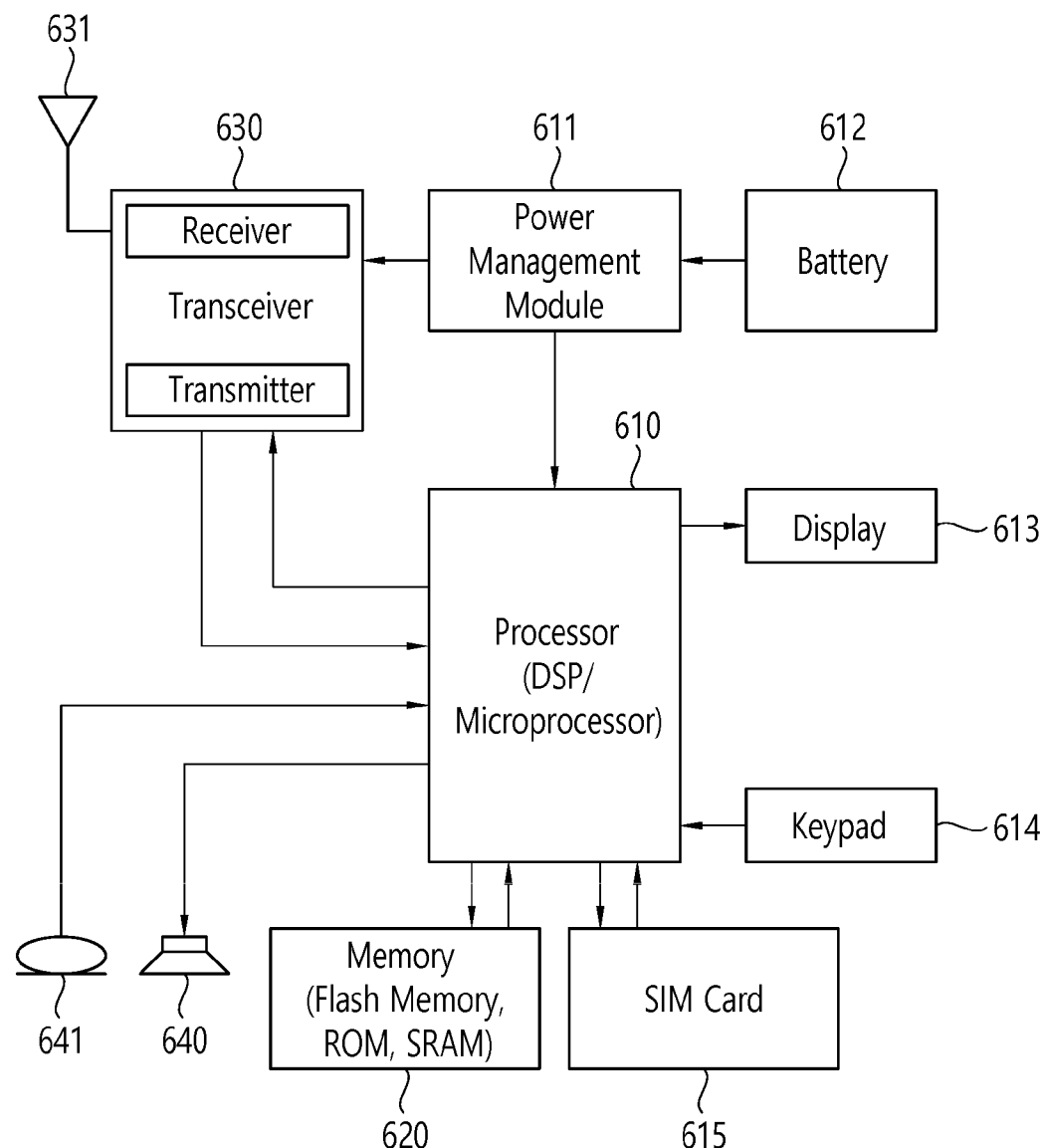
FIG. 7 shows an example of further details of a UE according to implementations of the present disclosure.

FIG. 7 shows an example of further details of a UE according to some implementations of the present disclosure. The examples of the present disclosure described above for UE side may be applied to this implementation. Specifically, this implementation may implement the implementation 1 described above.

A UE includes at least one processor such as a processor 610, a power management module 611, a battery 612, a display 613, a keypad 614, a subscriber identification module (SIM) card 615, at least one memory such as a memory 620, at least one transceiver such as a transceiver 630, one or more antennas 631, a speaker 640, and a microphone 641.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 610 is configured to select to create a configured sidelink grant corresponding to transmissions of multiple MAC PDUs. When data is available in a STCH associated with one or multiple carriers and there is no configured sidelink grant on any carrier, among the one or multiple carriers, allowed for the STCH, the processor 610 is configured to trigger TX carrier (re-)selection procedure.

The processor 610 may include a MAC entity. The MAC entity may be configured by an upper layer to transmit using pools of resources in the one or multiple carriers based on sensing, or partial sensing, or random selection. The upper layer may be RRC layer of the UE.

That the data is available in the STCH associated with the one or multiple carriers and there is no configured sidelink grant on any carrier allowed for the STCH may indicate that the data is available in the STCH not associated with currently selected carrier among the one or multiple carriers. The association between the STCH and the one or multiple carriers may be configured by a network and/or pre-configured. The STCH may be allowed to be transmitted in at least one carrier among the one or multiple carriers based on CBR and/or PPPP of the STCH.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the implementations are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various techniques as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

According to implementation of the present disclosure shown in FIG. 7, the new triggering condition TX carrier (re-)selection can be added. More specifically, even if upper layer configures multiple carriers for a first V2X service and MAC entity selects a carrier among the multiple carriers, and when new data for a second V2X service is available in a logical channel which is not associated with currently selected carrier, the TX carrier (re-)selection can be triggered, and a new carrier for the second V2X service can be selected.

Figure 8:
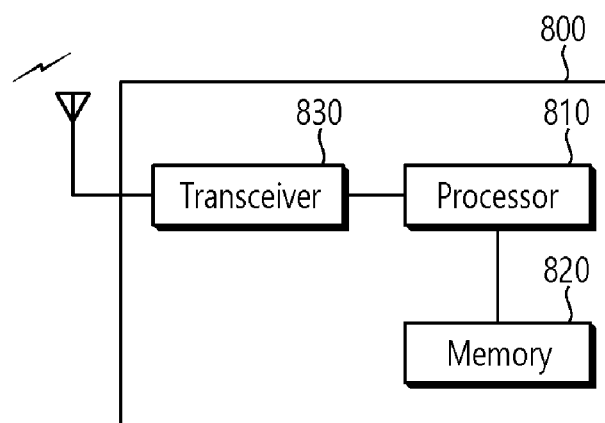
FIG. 8 shows an example of a network node according to implementations of the present disclosure.

FIG. 8 shows an example of a network node according to implementations of the present disclosure. The present disclosure described above for network side may be applied to this implementation.

A network node 800 includes at least one processor such as processor 810, at least one memory such as memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

The processor 810 may include ASIC, other chipset, logic circuit and/or data processing device. The memory 820 may include ROM, RAM, flash memory, memory card, storage medium and/or other storage device. The transceiver 830 may include baseband circuitry to process radio frequency signals. When the implementations are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various techniques as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device operating in a wireless communication system, the method comprising:
   determining that at least one currently selected carrier is not allowed to be used for a sidelink logical channel where data is available, wherein the sidelink logical channel is associated with a carrier;
   determining that a channel busy ratio (CBR) of the carrier is below a CBR threshold associated with a priority of the sidelink logical channel;
   considering the carrier as a candidate carrier for a transmission (TX) carrier selection or reselection based on i) the determination that the at least one currently selected carrier is not allowed to be used for the sidelink logical channel where the data is available, and ii) the determination that the CBR of the carrier is below the CBR threshold associated with the priority of the sidelink logical channel; and
   selecting one or more carriers among candidate carriers for the TX carrier selection or reselection including the carrier,
   wherein the CBR of the carrier comprises:
       a CBR value measured by the wireless device based on a CBR measurement result being available for the carrier; and
       a value configured by a network for the carrier based on the CBR measurement result not being available for the carrier.

2. The method of claim 1, wherein the method is performed by a media access control (MAC) entity of the wireless device.

3. The method of claim 2, wherein the MAC entity of the wireless device is configured by an upper layer of the wireless device to transmit using pools of resources in the carrier based on sensing, partial sensing, or random selection.

4. The method of claim 3, wherein the upper layer of the wireless device is a radio resource control (RRC) layer of the wireless device.

5. The method of claim 1, wherein the data available in the sidelink logical channel is not associated with the at least one currently selected carrier.

6. The method of claim 1, wherein an association between the sidelink logical channel and the carrier is configured by at least one of a network or a pre-configuration.

7. The method of claim 6, wherein the data in the sidelink logical channel is allowed to be transmitted through the carrier based on at least one of the CBR or a proximity-based services (ProSe) per-packet priority (PPPP) of the sidelink logical channel.

8. The method of claim 1, further comprising:
   transmitting the data in the sidelink logical channel through the carrier after the TX carrier selection or reselection.

9. A wireless device configured to operate in a wireless communication system, the wireless device comprising:
   a transceiver;
   at least one memory; and
   at least one processor operably connectable to the at least one memory and storing instructions that, when executed by the at least one processor, perform operations comprising:
   determining that at least one currently selected carrier is not allowed to be used for a sidelink logical channel where data is available, wherein the sidelink logical channel is associated with a carrier;
   determining that a channel busy ratio (CBR) of the carrier is below a CBR threshold associated with a priority of the sidelink logical channel;
   considering the carrier as a candidate carrier for a transmission (TX) carrier selection or reselection based on i) the determination that the at least one currently selected carrier is not allowed to be used for the sidelink logical channel where the data is available, and ii) the determination that the CBR of the carrier is below the CBR threshold associated with the priority of the sidelink logical channel; and
   selecting one or more carriers among candidate carriers for the TX carrier selection or reselection including the carrier,
   wherein the CBR of the carrier comprises:
       a CBR value measured by the wireless device based on a CBR measurement result being available for the carrier; and
       a value configured by a network for the carrier based on the CBR measurement result not being available for the carrier.

10. The wireless device of claim 9, wherein the operations are performed by a media access control (MAC) entity of the wireless device.

11. The wireless device of claim 10, wherein the MAC entity of the wireless device is configured by an upper layer of the wireless device to transmit using pools of resources in the carrier based on sensing, partial sensing, or random selection.

12. The wireless device of claim 11, wherein the upper layer of the wireless device is a radio resource control (RRC) layer of the wireless device.

13. The wireless device of claim 9, wherein the data available in the sidelink logical channel is not associated with the at least one currently selected carrier.

14. The wireless device of claim 9, wherein an association between the sidelink logical channel and the carrier is configured by at least one of a network or a pre-configuration.

15. The wireless device of claim 14, wherein the data in the sidelink logical channel is allowed to be transmitted through the carrier based on at least one of the CBR or a proximity-based services (ProSe) per-packet priority (PPPP) of the sidelink logical channel.

16. The wireless device of claim 9, wherein the operations further comprise:
    transmitting the data in the sidelink logical channel through the carrier after the TX carrier selection or reselection.

17. An apparatus comprising:
    at least one memory; and
    at least one processor operably connectable to the at least one memory and storing instructions that, when executed by the at least one processor, perform operations comprising:
        determining that at least one currently selected carrier is not allowed to be used for a sidelink logical channel where data is available, wherein the sidelink logical channel is associated with a carrier;
        determining that a channel busy ratio (CBR) of the carrier is below a CBR threshold associated with a priority of the sidelink logical channel;
        considering the carrier as a candidate carrier for a transmission (TX) carrier selection or reselection based on
            i) the determination that the at least one currently selected carrier is not allowed to be used for the sidelink logical channel where the data is available, and
            ii) the determination that the CBR of the carrier is below the CBR threshold associated with the priority of the sidelink logical channel; and
        selecting one or more carriers among candidate carriers for the TX carrier selection or reselection including the carrier,
    wherein the CBR of the carrier comprises:
        a CBR value measured by the apparatus based on a CBR measurement result being available for the carrier; and
        a value configured by a network for the carrier based on the CBR measurement result not being available for the carrier.

* * * * *